US012679744B2

(12) United States Patent
Hanafusa

(10) Patent No.: US 12,679,744 B2
(45) Date of Patent: Jul. 14, 2026

(54) METHOD FOR PRODUCING LITHIUM METAL COMPOSITE OXIDE

(71) Applicant: Sumitomo Metal Mining Co., Ltd., Tokyo (JP)

(72) Inventor: Tatsuya Hanafusa, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 483 days.

(21) Appl. No.: 18/252,263

(22) PCT Filed: Nov. 16, 2021

(86) PCT No.: PCT/JP2021/042047
§ 371 (c)(1),
(2) Date: May 9, 2023

(87) PCT Pub. No.: WO2022/107754
PCT Pub. Date: May 27, 2022

(65) Prior Publication Data
US 2024/0010518 A1     Jan. 11, 2024

(30) Foreign Application Priority Data

Nov. 17, 2020    (JP) ................................. 2020-190940

(51) Int. Cl.
*C01G 53/42*          (2025.01)
*H01B 1/08*           (2006.01)
*H01M 4/525*          (2010.01)

(52) U.S. Cl.
CPC .............. *C01G 53/42* (2013.01); *H01B 1/08* (2013.01); *H01M 4/525* (2013.01); *C01P 2002/54* (2013.01); *C01P 2006/40* (2013.01)

(58) Field of Classification Search
CPC .. H01B 1/00; H01B 1/08; H01M 4/04; H01M 4/0471; C01G 53/42
See application file for complete search history.

(56) References Cited

U.S. PATENT DOCUMENTS 6,248,477 B1 * 6/2001 Howard, Jr. ......... C01G 55/002
429/231.95
7,939,202 B2 * 5/2011 Sakamoto .............. C01G 53/50
429/231.95

(Continued)

FOREIGN PATENT DOCUMENTS

CN        109863630 A       6/2019
JP        11-139829 A       5/1999

(Continued)

OTHER PUBLICATIONS

Liang et al."State-of-the-Art Production Technology of Cathode and Anode Materials for Lithium-Ion Batteries", (76 pages) Chapter 8 of Lithium-Ion Batteries 2011; CRC Press.*

(Continued)

*Primary Examiner* — Mark Kopec
(74) *Attorney, Agent, or Firm* — Rimon P.C.

(57) ABSTRACT

A method for producing a lithium metal composite oxide includes charging a substance to be treated from an inlet of a heating facility including a rotary cylinder having the inlet and an outlet, rotating the rotary cylinder around an axis of the rotary cylinder under supply of an oxygen-containing gas to move the substance in a direction toward the outlet and heat the substance, and discharging the heated substance from the outlet, in which the substance includes one of a mixture of a metal composite compound and a lithium compound and a reactant of the metal composite compound and the lithium compound, in a heating region of the heating facility, an average movement distance of the substance where a surface of a layer of the substance is moved is 13 m or more, and a temperature in the heating region is 700 to 900° C.

12 Claims, 4 Drawing Sheets

(56) References Cited

U.S. PATENT DOCUMENTS

| 8,460,822 | B2 * | 6/2013 | Yamamoto | H01M 4/525 |
| | | | | 429/223 |
| 8,980,475 | B2 * | 3/2015 | Schroedle | C01G 53/50 |
| | | | | 429/223 |
| 11,367,872 | B2 * | 6/2022 | Park | H01M 4/582 |
| 2011/0250499 | A1 | 10/2011 | Hiratsuka | |
| 2014/0234203 | A1 | 8/2014 | Park et al. | |
| 2018/0316004 | A1 | 11/2018 | Tokoro et al. | |
| 2021/0028445 | A1 | 1/2021 | Jung et al. | |

FOREIGN PATENT DOCUMENTS

| JP | 2009-216342 | A | 9/2009 | |
| JP | 2011-044364 | A | 3/2011 | |
| JP | 5401211 | B2 | 1/2014 | |
| JP | 6369644 | B2 | 8/2018 | |
| JP | 6254732 | B1 | 12/2018 | |
| JP | 2019-075253 | A | 5/2019 | |
| JP | 2019-175696 | A | 10/2019 | |
| JP | 2020-017534 | A | 1/2020 | |
| WO | 2010/113512 | A1 | 10/2010 | |
| WO | 2019/198944 | A1 | 10/2019 | |
| WO | WO-2023242375 | A1 * | 12/2023 | H01M 4/0471 |

OTHER PUBLICATIONS

English translation of form PCT/ISA/237 (mailed Feb. 1, 2022).*
International Search Report issued in corresponding International
Patent Application No. PCT/JP2021/042047, dated Feb. 1, 2022,
with English translation.
Japanese Notice of Reasons for Refusal issued in corresponding
Japanese Patent Application No. 2022-511222 dated May 31, 2022,
with English translation.

* cited by examiner

METHOD FOR PRODUCING LITHIUM METAL COMPOSITE OXIDE

CROSS REFERENCE TO RELATED APPLICATIONS

This application is the U.S. National Phase under 35 U.S.C. § 371 of International Application No. PCT/JP2021/042047, filed on Nov. 16, 2021, which claims the benefit of Japanese Application No. 2020-190940, filed on Nov. 17, 2020, the entire contents of each are hereby incorporated by reference.

TECHNICAL FIELD

The present invention relates to a method for producing a lithium metal composite oxide.

BACKGROUND ART

Lithium metal composite oxides are being used as positive electrode active materials for lithium secondary batteries. Attempts of putting lithium secondary batteries into practical use not only for small-sized power sources in mobile phone applications, notebook personal computer applications, and the like but also for medium-sized or large-sized power sources in automotive applications, power storage applications, and the like have already been underway.

A method for producing a lithium metal composite oxide includes a step of mixing a metal composite compound that is a precursor and a lithium compound and calcining an obtained mixture. When the mixture is calcined, a reaction between oxygen in the calcining atmosphere and the mixture, that is, an oxidation reaction is caused. Such a calcining step is performed using a continuous calcining furnace such as a tunnel furnace or a roller hearth kiln, a fluidized calcining furnace such as a rotary kiln, or the like.

When a fluidized calcining furnace such as a rotary kiln is used, the mixture is calcined while being stirred, and thus the heating efficiency of the mixture improves compared with a case where a continuous calcining furnace such as a roller hearth kiln is used. Therefore, it is known that the calcining time of the mixture can be shortened. For example, Patent Document 1 discloses that a lithium compound and a metal compound are calcined using a rotary kiln.

CITATION LIST

Patent Document

[Patent Document 1]
JP-A-2011-044364

SUMMARY OF INVENTION

Technical Problem

It is known that the use of a fluidized calcining furnace improves the heating efficiency of a mixture of a metal composite compound and a lithium compound and makes it possible to shorten the calcining time in a calcining step, but improvement in the heating efficiency alone is not enough to obtain a lithium metal composite oxide enabling lithium secondary batteries having a high cycle retention rate to be achieved. That is, there is room for additional improvement in conditions for producing lithium metal composite oxides.

The present invention has been made in view of the above-described circumstances, and an object of the present invention is to provide a method for producing a lithium metal composite oxide enabling the obtainment of lithium secondary batteries having a high cycle retention rate when used as a positive electrode active material.

Solution to Problem

When a mixture of a metal composite compound and a lithium compound or a reactant of a metal composite compound and a lithium compound (hereinafter, referred to as the substance to be treated in some cases) is calcined, if the reactivity between the substance to be treated and oxygen is low, an oxygen deficient structure is likely to be generated in a lithium metal composite oxide. When an oxygen deficient structure is generated, the cycle retention rates of lithium secondary batteries for which a lithium metal composite oxide is used as a positive electrode active material are likely to decrease. The present inventors paid attention to the fact that, in a method for producing a lithium metal composite oxide, when a reaction between a substance to be treated and oxygen in the calcining atmosphere is promoted, a lithium metal composite oxide enabling a lithium secondary battery having a high cycle retention rate to be achieved can be obtained.

In order to obtain a lithium metal composite oxide enabling the obtainment of a lithium secondary battery having a high cycle retention rate, the present invention was completed from the viewpoint of improving the heating efficiency using a fluidized calcining furnace and of sufficiently reacting a substance to be treated and oxygen with imparted heat.

The present invention has the following aspects.

[1] A method for producing a lithium metal composite oxide, including rotating a rotary cylinder around an axis of the rotary cylinder under supply of an oxygen-containing gas using a heating facility including the rotary cylinder having an inlet at one end and an outlet at the other end to move the substance to be treated charged from the inlet of the heating facility in a direction toward the outlet and heating the substance to be treated, in which the substance to be treated includes one of a mixture of a metal composite compound and a lithium compound and a reactant of the metal composite compound and the lithium compound, in a heating region of the heating facility, an average movement distance of the substance to be treated where a surface of a layer of the substance to be treated is moved is 13 m or longer, and a heating temperature in the heating region is 700 to 900° C.

[2] A method for producing a lithium metal composite oxide, including charging a substance to be treated from an inlet of a heating facility including a rotary cylinder having the inlet at one end and an outlet at the other end, using the heating facility, rotating the rotary cylinder around an axis of the rotary cylinder under supply of an oxygen-containing gas to move the substance to be treated in a direction toward the outlet and heating the substance to be treated, and discharging the heated substance to be treated from the outlet, in which the substance to be treated includes one of a mixture of a metal composite compound and a lithium compound and a reactant of the metal composite compound and the lithium compound, in a heating region of the heating facility, an average movement distance of the substance to be treated where a surface of a layer of the substance to be treated is moved is 13 m or longer, and a heating temperature in the heating region is 700 to 900° C.

[3] The method according to [1] or [2], in which the average movement distance of the substance to be treated is 15 m or longer.

[4] The method according to any one of [1] to [3], in which the lithium compound is lithium hydroxide.

[5] The method according to any one of [1] to [4], in which the substance to be treated is heated while the oxygen-containing gas is supplied into the rotary cylinder such that a ratio of an oxygen-containing gas flow rate to a mass of the substance to be treated becomes 0.5 Nm³/kg or more.

[6] The method according to any one of [1] to [5], in which the substance to be treated is continuously heated while the oxygen-containing gas is supplied into the rotary cylinder from the outlet, the oxygen-containing gas is discharged from the inlet, and, furthermore, outflow of the oxygen-containing gas from the outlet is blocked.

[7] The method according to any one of [1] to [6], in which the substance to be treated is heated such that a value represented by a formula (IV) satisfies 0.80 to 1.30.

Volume [m³/hr] of substance to be treated that is charged per hour/volume [m/hr] of heated substance to be treated that is discharged per hour (IV)

Volume [m³/hr] of substance to be treated that is charged per hour=amount [kg/hr] of substance to be treated charged/average bulk density [kg/m³] of substance to be treated (IV-i)

Volume [m³/hr] of heated substance to be treated that is discharged per hour=amount [kg/hr] of heated substance to be treated discharged/average bulk density [kg/m³] of heated substance to be treated (IV-ii).

The method according to any one of [1] to [7], in which the substance to be treated is heated while the rotary cylinder is rotated such that a rotation speed becomes 0.003 to 0.5 rad/sec.

The method according to any one of [1] to [8], in which the lithium metal composite oxide is represented by a composition formula (V).

$$Li[Li_m(Ni_{(1-n)}X_n)_{1-m}]O_2 \tag{V}$$

(in the formula (V), X represents one or more elements selected from the group consisting of Co, Mn, Fe, Cu, Ti, Mg, Al, W, Mo, Nb, Zn, Sn, Zr, Ga, V, B, Si, S, and P, $-0.1 \leq m \leq 0.2$, $0 < n < 0.7$, and $0 < m+n < 0.8$ are satisfied).

Advantageous Effects of Invention

According to the present invention, it is possible to provide a method for producing a lithium metal composite oxide enabling the obtainment of lithium secondary batteries having a high cycle retention rate when used as a positive electrode active material.

DESCRIPTION OF EMBODIMENTS

Figure 1:
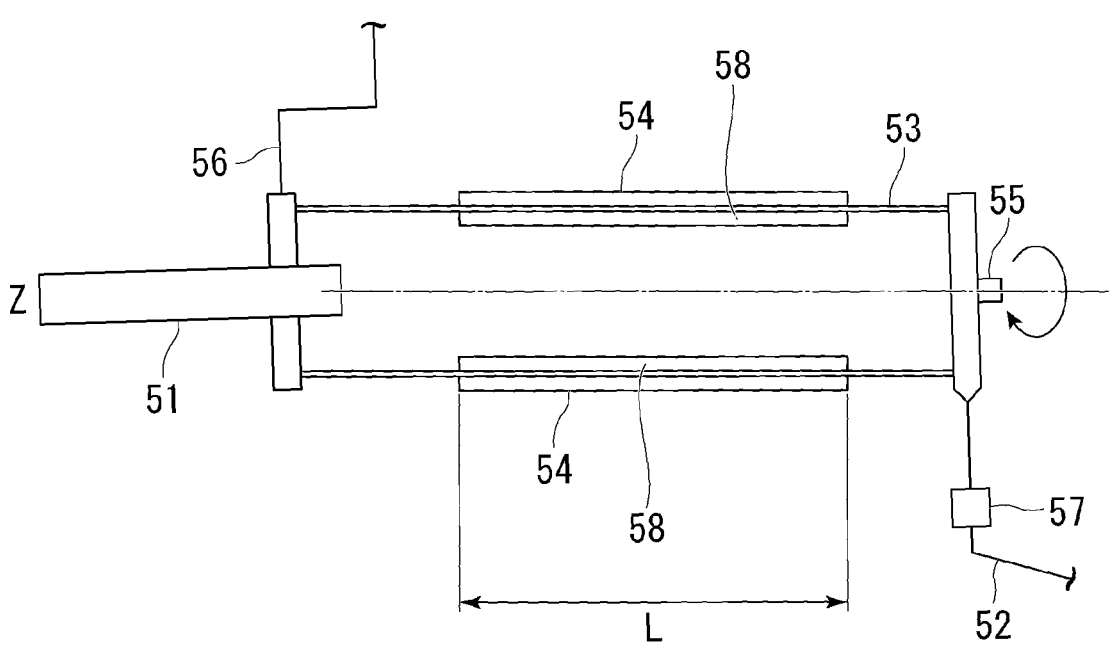
FIG. 1 is a schematic cross-sectional view of a calcining device that is used in a method for producing a lithium metal composite oxide in one aspect of the present embodiment.

Hereinafter, a method for producing a lithium metal composite oxide according to one aspect of the present invention will be described. In a plurality of embodiments to be described below, preferable examples or conditions may be shared.

In the present specification, a metal composite compound will be hereinafter referred to as "MCC", a lithium metal composite oxide will be hereinafter referred to as "LiMO", and a positive electrode active material (cathode active material) for a lithium secondary battery will be hereinafter referred to as "CAM".

In the present specification. "Ni" refers not to a nickel metal but to a nickel atom, and "Co", "Li", and the like also, similarly, each refer to a cobalt atom, a lithium atom, or the like.

In a case where a numerical range is expressed as, for example, "1 to 10 μm", this means a range from 1 μm to 10 μm and means a numerical range including 1 μm, which is the lower limit value, and 10 μm, which is the upper limit value.

"Cycle retention rate" is measured by the following method. "The cycle retention rate is high" means that the value of the cycle retention rate exceeds 86%. First, a lithium secondary battery of a coin-type half cell is left to stand at room temperature for 10 hours to sufficiently impregnate the separator and the positive electrode mixture layer with an electrolytic solution.

Next, constant-current constant-voltage charging by which the lithium secondary battery is constant-current charged up to 4.3 V at room temperature at 1 mA and then constant-voltage charged at 4.3 V is performed for 5 hours, and then constant-current discharging by which the lithium secondary battery is discharged to 2.5 V at 1 mA is performed, thereby performing initial charge and discharge.

The discharge capacity is measured, and the obtained value is defined as the "initial discharge capacity" (mAh/g).

The charge capacity is measured, and the obtained value is defined as the "initial charge capacity" (mAh/g).

After the initial charge and discharge, charge at 1 mA and discharge at 1 mA are repeated under the same conditions as the initial charge and discharge. After that, the discharge capacity (mAh/g) at the 50th cycle is measured.

From the initial discharge capacity and the discharge capacity at the 50th cycle, the cycle retention rate is calculated by the following formula. As the cycle retention rate increases, a decrease in the battery capacity after the repetition of charge and discharge is further suppressed, which is desirable as the battery performance.

$$\text{Cycle retention rate (\%)} = 50^{th} \text{ cycle discharge capacity (mAh/g)/initial discharge capacity (mAh/g)} \times 100$$

<Method for Producing LiMO>

A method for producing LiMO of the present embodiment includes charging a substance to be treated from an inlet of a heating facility including a rotary cylinder having the inlet at one end and an outlet at the other end, using the heating facility, heating the substance to be treated while rotating the rotary cylinder around an axis of the rotary cylinder under supply of an oxygen-containing gas and to move the substance to be treated in a direction toward the outlet, and discharging the heated substance to be treated from the outlet, in which the substance to be treated includes one of a mixture of MCC and a lithium compound and a reactant of MCC and the lithium compound, in a heating region of the heating facility, an average movement distance of the substance to be treated where a surface of a layer of the substance to be treated is moved is 13 m or longer, and a heating temperature in the heating region is 700 to 900° C.

In the method for producing LiMO of the present embodiment, a substance to be treated is heated using a heating facility having a rotary cylinder that has an inlet at one end and an outlet at the other end and is rotatable around the axis. As such a heating facility, a rotary kiln or a semi-cylindrical rocking furnace is an exemplary example. As the heating facility, a rotary kiln is preferably used. In the following description, a rotary kiln is used as a heating facility 50, and the heating facility 50 will be referred to as the "rotary kiln 50" in the description.

FIG. 1 is a schematic cross-sectional view of the heating facility that is used in the method for producing LiMO in one aspect of the present embodiment. In FIG. 1, the rotary kiln 50 is a facility that heats a substance to be treated in a rotary cylinder 53 having an inlet 51 at one end and an outlet 52 at the other end. That is, the rotary cylinder 53 is a heating furnace, and the substance to be treated is heated in the rotary cylinder 53.

Figure 2:
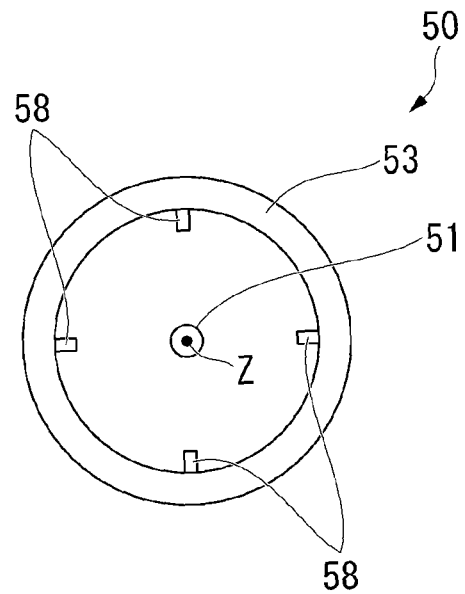
FIG. 2 is a schematic cross-sectional view of a rotary cylinder.

FIG. 2 is a schematic cross-sectional view of the rotary cylinder 53. The rotary cylinder 53 is cylindrical and rotatable around the axis Z as a rotation axis. The rotary cylinder 53 is installed at a slant with the inlet 51 upward and the outlet 52 downward. The slant angle of the rotary cylinder 53 is preferably 0.1° or more and 10° or less. A heat-resistant alloy or ceramic can be used for the inner wall of the rotary cylinder 53.

The volume of the rotary cylinder 53 is, for example, 0.0001 m³ to 500 m³, preferably 0.0005 m³ to 300 m³, and more preferably 0.001 m³ to 200 m³.

A gas supply port 55 and a gas discharge port 56 are provided in the rotary kiln 50. The gas discharge port 56 is disposed at one end where the inlet 51 is provided. The gas supply port 55 is disposed at the other end where the outlet 52 is provided. An oxygen-containing gas is supplied to the inside of the rotary cylinder 53 from the gas supply port 55. The oxygen-containing gas is discharged from the inside of the rotary cylinder 53 to the outside through the gas discharge port 56. Based on the disposition of the gas supply port 55 and the gas discharge port 56, the oxygen-containing gas flows in a direction opposite to the moving direction of the substance to be treated.

The oxygen-containing gas that is supplied from the gas supply port 55 contains oxygen or a gas mixture containing at least oxygen and at least one of the air, nitrogen, and argon. In the present embodiment, the gas that is supplied is preferably oxygen. In a case where the gas that is supplied is a gas mixture, an effect that promotes a reaction between the substance to be treated and the oxygen in the calcining atmosphere becomes higher as the oxygen concentration becomes higher. On the other hand, the oxygen concentration may be appropriately set from the viewpoint of cost reduction. Specifically, the oxygen concentration in the gas mixture is preferably 20 vol % or more and less than 100 vol % and more preferably 50 vol % to 99 vol %.

A valve 57 such as a rotary valve or a double damper may be provided between the outlet 52 and the rotary cylinder 53 in order to block the flow of the oxygen-containing gas that is discharged from the outlet 52.

Heating means 54 is provided in the rotary cylinder 53. A region where the heating means 54 is provided in the rotary cylinder 53 is a heating region L and is a region where the substance to be treated is substantially heated. The calcining temperature in the heating region L is 700 to 900° C. The length of the heating region L is a dimension from the end of the heating means 54 on the inlet 51 side to the end of the heating means 54 on the outlet 52 side. A plurality of the heating means 54 may be provided. In a case where a plurality of heating means 54 is provided, the heating region L is from the end of the heating means 54 closest to the inlet 51 on the inlet 51 side to the end of the heating means 54 closest to the outlet 52 on the outlet 52 side. The length of the heating region L in a case where a plurality of heating means 54 is provided is a dimension from the end of the heating means 54 closest to the inlet 51 on the inlet 51 side to the end of the heating means 54 closest to the outlet 52 on the outlet 52 side.

The length of the heating region L is, for example, 0.1 to 100 m, preferably 0.3 to 50 m, and more preferably 0.5 to 20 m.

The heating means 54 may cover the entire outer circumference of the rotary cylinder 53 or may be disposed adjacent to a portion of the outer circumference of the rotary cylinder 53. Even in a case where the heating means 54 is disposed adjacent to a portion of the outer circumference of the rotary cylinder 53, all of the inside of the rotary cylinder 53 is heated with the heating means 54 by rotating the rotary cylinder 53 in a state where the heating means 54 is fixed.

Stirring blades 58 may be provided on the inner circumferential surface of the rotary cylinder 53. Specifically, the stirring blades 58 are plate-like protrusions. The stirring blades 58 are installed so as to be in contact with the inner circumferential surface of the rotary cylinder 53 and extend along the axis Z. The stirring blades 58 are continuously or intermittently disposed from the vicinity of the inlet 51 to the vicinity of the outlet 52. The heights of the stirring blades 58 (in other words, the dimensions from the inner circumferential surface of the rotary cylinder 53 to the tips of the stirring blades 58 in a direction toward the axis Z) are half or less of the radius of the rotary cylinder 53. The stirring blades 58 provided make it possible to more efficiently stir the substance to be treated. As a result, it is possible to uniformly and rapidly heat the substance to be treated.

As an example, the stirring blades 58 are installed at quadrisected (that is, every 90°) positions along the circumferential direction of the rotary cylinder 53. However, the shapes and number of the stirring blades 58 are not particularly limited and can be appropriately selected in consideration of the stirring efficiency as long as the movement of the substance to be treated is not hindered. For example, as the shape of the stirring blade 58 when the rotary cylinder 53 is viewed in the Z-axis direction, a rectangular shape, a triangular shape, and the like are exemplary examples. The number of the stirring blades 58 may be plural, such as 2 to 5. In addition, the rotary kiln 50 shown in FIG. 1 and FIG. 2 is shown to have the stirring blades 58 as an example, but may not be provided with the stirring blades 58.

The material of the stirring blade 58 is not particularly limited, and, for example, heat-resistant metals such as a nickel-containing alloy and a chromium-containing alloy are exemplary examples.

The substance to be treated that is heated with the rotary kiln 50 includes one of a mixture of MCC and a lithium compound and a reactant of MCC and a lithium compound. The mixture of MCC and the lithium compound is obtained by mixing MCC and the lithium compound without heating or preliminary calcining. The reactant of MCC and the lithium compound is obtained by preliminarily calcining MCC and the lithium compound as described below.

MCC is a compound enabling the production of LiMO by being calcined together with a lithium compound. For example, a metal composite oxide or a metal composite hydroxide are exemplary examples.

MCC is preferably MCC containing Ni and an element X. The element X represents one or more elements selected from the group consisting of Co, Mn, Fe, Cu, Ti, Mg, Al, W, Mo, Nb, Zn, Sn, Zr, Ga, V, B, Si, S, and P.

The mole ratio of the element X to the sum of Ni and the element X is preferably more than 0 and less than 0.7, preferably more than 0 and 0.6 or less, and more preferably more than 0 and 0.3 or less. When the mole ratio of the element X to the sum of Ni and the element X is more than 0 and less than 0.7. LiMO can be used for lithium secondary batteries having a relatively large capacity. In a case where the mole ratio of the element X to the sum of Ni and the element X is 0.3 or less, that is, in a case where the mole ratio of Ni to the sum of Ni and the element X is 0.7 or more, a higher concentration of oxygen is required for the reaction between the substance to be treated and oxygen in the calcining atmosphere. Therefore, the method for producing LiMO of the present embodiment is highly effective in promoting the oxidation reaction of the substance to be treated in a case where the mole ratio of Ni is high.

MCC can be produced by, for example, the following method. As an example, a production method in a case where MCC is a precursor containing Ni, Co, and Al will be described.

First, a metal composite hydroxide containing Ni, Co, and Al is prepared by the following method. Usually, the metal composite hydroxide can be produced by a well-known batch-type co-precipitation method or continuous co-precipitation method.

Specifically, a nickel salt solution, a cobalt salt solution, an aluminum salt solution, and a complexing agent are reacted with one another by a continuous coprecipitation method described in Japanese Unexamined Patent Application, First Publication No. 2002-201028, thereby producing a metal composite hydroxide represented by $Ni_{(1-a-b)}Co_aAl_b$ $(OH)_2$ (in the formula, $0<a+b<0.7$, a+b is the same as n in a composition formula (V) to be described below.).

A nickel salt that is a solute of the nickel salt solution is not particularly limited, and, for example, at least one of nickel sulfate, nickel nitrate, nickel chloride, and nickel acetate can be used.

As a cobalt salt that is a solute of the cobalt salt solution, for example, at least one of cobalt sulfate, cobalt nitrate, cobalt chloride, and cobalt acetate can be used.

As an aluminum salt that is a solute of the aluminum salt solution, at least one of aluminum sulfate, aluminum nitrate, aluminum chloride, and aluminum acetate can be used.

The above-described metal salts are used in fractions corresponding to the composition ratio of $Ni_{(1-a-b)}Co_aAl_b$ $(OH)_2$. That is, the amount of each metal salt is specified so that the mole ratio of Ni, Co, and Al in a mixed solution containing the above-described metal salts corresponds to $(1-a-b):a:b$ of the precursor. In addition, as the solvent, water is used.

The complexing agent is capable of forming a complex with a nickel ion, a cobalt ion, and an aluminum ion in an aqueous solution, and examples thereof include ammonium ion donors (ammonium hydroxide, ammonium sulfate, ammonium chloride, ammonium carbonate, ammonium fluoride, and the like), hydrazine, ethylenediaminetetraacetic acid, nitrilotriacetic acid, uracildiacetic acid, and glycine.

In the production step of the metal composite hydroxide, the complexing agent may or may not be used. In a case where the complexing agent is used, regarding the amount of the complexing agent that is contained in the liquid mixture containing the nickel salt solution, the cobalt salt solution, the aluminum salt solution, and the complexing agent, for example, the mole ratio of the complexing agent to the sum of the mole numbers of the metal salts (a nickel salt, a cobalt salt and an aluminum salt) is more than 0 and 2.0 or less.

In the co-precipitation method, in order to adjust the pH value of the liquid mixture containing the nickel salt solution, the cobalt salt solution, the aluminum salt solution, and the complexing agent, an alkali metal hydroxide is added to the liquid mixture before the pH of the liquid mixture turns from alkaline into neutral. The alkali metal hydroxide is, for example, sodium hydroxide or potassium hydroxide.

The value of pH in the present specification is defined as a value measured when the temperature of the liquid mixture is 40° C. The pH of the liquid mixture is measured when the temperature of the liquid mixture sampled from a reaction vessel reaches 40° C. In a case where the sampled liquid mixture is lower than 40° C., the liquid mixture is heated up to 40° C. and the pH is measured. In a case where the sampled liquid mixture exceeds 40° C., the pH of the liquid mixture cooled to 40° C. is measured.

When the complexing agent in addition to the nickel salt solution, the cobalt salt solution, and the aluminum salt solution is continuously supplied to and stirred in the reaction vessel, Ni, Co, and Al react with one another, and $Ni_{(1-a-b)}Co_aAl_b(OH)_2$ is generated.

At the time of the reaction, the temperature of the reaction vessel is controlled within a range of, for example, 20 to 80° C. and preferably 30 to 70° C.

In addition, at the time of the reaction, the pH value in the reaction vessel is controlled, for example, within a range of pH 9 to 13 and preferably pH 10.5 to 12.4.

A reaction precipitate formed in the reaction vessel is neutralized under stirring. The time for the neutralization of the reaction precipitate is preferably 1 to 20 hours and more preferably 5 to 15 hours.

As the reaction vessel that is used in the continuous co-precipitation method, it is possible to use a reaction vessel in which the formed reaction precipitate is caused to overflow for separation.

A variety of gases, for example, an inert gas such as nitrogen, argon, or carbon dioxide, an oxidizing gas such as an air or oxygen, or a gas mixture thereof may be supplied into the reaction vessel.

As the reaction vessel that is used in a batch-type co-precipitation method, a reaction vessel not equipped with an overflow pipe can be used. Alternatively, it is also possible to use a device equipped with a condensation tank connected to an overflow pipe and having a mechanism in which a reaction precipitate that has overflowed is condensed in a condensation layer and again circulated to a reaction vessel.

After the above-described reaction, the neutralized reaction precipitate is isolated. For isolation, for example, a method in which a slurry containing the reaction precipitate (co-precipitate slurry) is dehydrated by centrifugation, suction filtration, or the like is used.

The neutralized reaction precipitate is washed, dehydrated, dried, and sieved, and a metal composite hydroxide containing Ni, Co, and Al is obtained.

The reaction precipitate is preferably washed with water or an alkaline washing liquid. In the present embodiment, the co-precipitate is preferably washed with an alkaline washing liquid and more preferably washed with a sodium hydroxide solution. In addition, the precursor hydroxide may be washed using a washing liquid containing a sulfur element. As the washing liquid containing a sulfur element, a sulfate aqueous solution of potassium or sodium or the like is an exemplary example.

In a case where MCC is a metal composite oxide, the metal composite oxide can be produced by heating the metal composite hydroxide obtained by the above-described method. Specifically, the metal composite hydroxide is heated at 400 to 700° C. If necessary, a plurality of heating steps may be performed. The heating temperature in the present specification means the set temperature of a heating device. In the case of having a plurality of heating steps, the heating temperature means the temperature when the metal composite hydroxide is heated at the highest holding temperature among individual heating steps.

The heating temperature is preferably 400 to 700° C. and more preferably 450 to 680° C. When the heating temperature is 400 to 700° C., the metal composite hydroxide is appropriately oxidized.

The time during which the metal composite hydroxide is held at the heating temperature is, for example, 0.1 to 20 hours and preferably 0.5 to 10 hours. The temperature rising rate up to the heating temperature is usually 50 to 400° C./hour, and the temperature decrease rate from the heating temperature to room temperature is usually 10 to 400° C./hour. In addition, as the heating atmosphere, it is possible to use the atmosphere, oxygen, nitrogen, argon or a gas mixture thereof.

The inside of the heating device may have an appropriate oxygen-containing atmosphere. The oxidizing atmosphere may be an oxygen-containing atmosphere formed by mixing an oxidizing gas into an inert gas or an oxidizing agent may be present in an inert gas atmosphere.

As oxygen or the oxidizing agent in the oxidizing atmosphere, a sufficient number of oxygen atoms need to be present in order to oxidize the transition metal.

In a case where the oxidizing atmosphere is an oxygen-containing atmosphere, the atmosphere in the heating device can be controlled by a method such as the aeration of an oxidizing gas into the heating device.

As the oxidizing agent, it is possible to use a peroxide such as hydrogen peroxide, a peroxide salt such as permanganate, perchloric acid, hypochlorous acid, nitric acid, halogen, ozone, or the like.

The metal composite hydroxide or metal composite oxide, which is MCC, can be produced as described above.

As the lithium compound that is used in the present embodiment, it is possible to use at least any one of lithium carbonate, lithium nitrate, lithium acetate, lithium hydroxide, lithium oxide, lithium chloride, and lithium fluoride. Among these, lithium hydroxide is preferable since the reactivity with MCC is high.

The lithium compound and MCC are mixed in consideration of the composition ratio of a final target product to obtain a mixture. Specifically, the lithium compound and MCC are preferably mixed at proportions corresponding to the composition ratio of the composition formula (V) to be described below.

The reactant of MCC and the lithium compound is obtained by preliminarily calcining MCC and the lithium compound. The reactant of MCC and the lithium compound obtained by preliminary calcining (that is, the calcined product) can be employed as the substance to be treated.

In the present embodiment, preliminary calcining refers to calcining at a temperature lower than the heating temperature of the substance to be treated to be described below. The calcining temperature during the preliminary calcining is, for example, in a range of 350° C. or higher and lower than 700° C. The preliminary calcining may be performed a plurality of times.

A calcining device used for the preliminary calcining is not particularly limited, and the preliminary calcining may be performed using, for example, any of a continuous calcining furnace or a fluidized calcining furnace. As the fluidized calcining furnace, the rotary kiln 50 may be used.

Next, a step of heating the substance to be treated using the above-described rotary kiln 50 will be described.

The above-described substance to be treated is supplied from the inlet 51 while the rotary cylinder 53 is rotated. In the rotary kiln 50, the substance to be treated is continuously heated while the substance to be treated is moved from the inlet 51 in a direction toward the outlet 52 by the force of gravity and the rotation of the rotary cylinder 53.

At this time, the substance to be treated is heated in an oxygen-containing atmosphere. An oxygen-containing gas is supplied from the gas supply port 55 on the outlet 52 side and discharged from the gas discharge port 56 on the inlet 51 side such that the oxygen-containing gas flows in a direction opposite to the moving direction of the substance to be treated in the rotary cylinder 53. As the substance to be treated charged into the rotary cylinder 53 moves in the rotary cylinder 53 and approaches the gas supply port 55, the reaction of the substance to be treated further progresses. An oxygen-containing gas containing a high concentration of oxygen is required to further react the substance to be treated of which the reaction is in progress. Therefore, when the oxygen-containing gas is controlled to flow in the direction opposite to the moving direction of the substance to be treated, in a region where the reaction of the substance to be treated is in progress, the oxygen concentration of the oxygen-containing gas increases, and it is possible to promote the final reaction of the substance to be treated.

In addition, since oxygen contained in the oxygen-containing gas is consumed by the reaction with the substance to be treated, the oxygen concentration of the oxygen-containing gas becomes low in the vicinity of the inlet 51. However, even such an oxygen-containing gas contains a sufficient concentration of oxygen with respect to the substance to be treated that has been just charged into the rotary cylinder 53.

Particularly, in a case where a high concentration of Ni is contained in MCC, for example, in a case where n in the formula (V) to be described below is more than 0 and 0.3 or less, it is possible to promote the reaction by the direct contact between the high concentration of oxygen and the substance to be treated. Therefore, when the oxygen-containing gas is supplied from the gas supply port 55 and discharged from the gas discharge port 56 such that the oxygen-containing gas flows in a direction opposite to the moving direction of the substance to be treated in the rotary cylinder 53 as described above, a promotion effect of the reaction between the substance to be treated and oxygen is large.

Furthermore, it is preferable to block the outflow of the oxygen-containing gas that is discharged from the outlet 52 with the valve 57.

In a case where the valve 57 is a rotary valve, the discharge of the oxygen-containing gas from the outlet 52 is blocked at all times during the heating of the substance to be treated by operating the rotary valve.

In a case where the valve 57 is a double damper, the discharge of the oxygen-containing gas from the outlet 52 is blocked by closing one damper at the same timing as the opening of the other damper.

It is preferable that the substance to be treated is heated while the oxygen-containing gas is supplied into the rotary cylinder 53 so that the ratio of the oxygen-containing gas flow rate to the mass of the substance to be treated becomes 0.5 $Nm^3$/kg or more. The ratio of the oxygen-containing gas flow rate to the mass of the substance to be treated is more preferably 0.5 to 20 $Nm^3$/kg and still more preferably 0.6 to 10 $Nm^3$/kg. When the ratio of the oxygen-containing gas flow rate to the mass of the substance to be treated is 0.5 $Nm^3$/kg or more, it is possible to sufficiently enhance the reaction between the substance to be treated and oxygen.

The heating temperature of the substance to be treated in the present embodiment is 700 to 900° C. preferably 710 to 850° C. and more preferably 720 to 800° C. When the heating temperature is 700° C. or higher, it is possible to promote the growth of LiMO particles and to obtain LiMO having a strong crystal structure. In addition, when the heating temperature is 900° C. or lower, it is possible to prevent the formation of cracks in the LiMO particles and to maintain the strength of the LiMO particles, and the volatilization of lithium on the surfaces of secondary particles contained in LiMO can be reduced.

The heating temperature in the present specification means the highest temperature of the atmosphere in the rotary cylinder 53.

The holding time in the heating is preferably 1 to 50 hours. When the holding time in the heating is 1 hour or longer, the development of crystals becomes favorable. When the holding time in the heating is 50 hours or shorter, the volatilization of lithium is less likely to occur.

In the present specification, the holding time in the heating is defined as the time taken for the substance to be treated to reach the region where the heating means 54 is provided and then reach the end of the region where the heating means 54 is provided.

Figure 3:
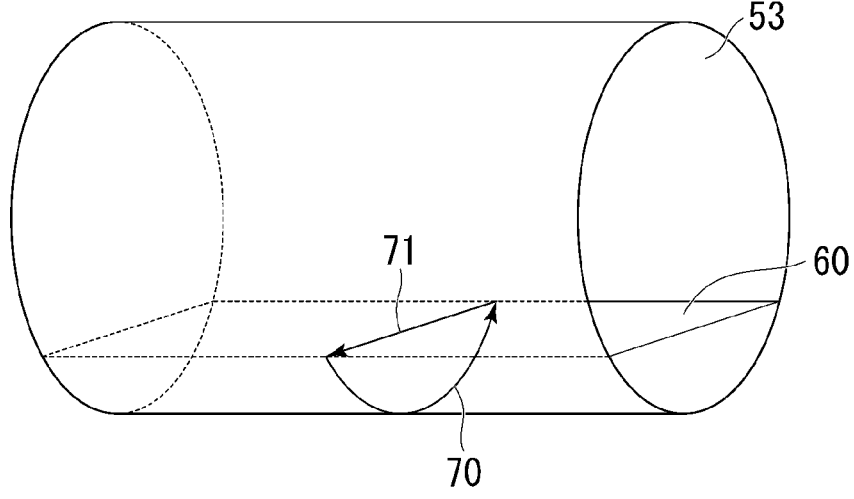
FIG. 3 is a schematic view for describing operation of a substance to be treated in the method for producing the lithium metal composite oxide in one aspect of the present embodiment.

The substance to be treated is heated under a condition under which the average movement distance of the substance to be treated where the surface of the layer of the substance to be treated is moved in the heating region of the heating facility (hereinafter, simply referred to as the average movement distance in some cases), which is calculated by a method to be described below, becomes 13 m or longer. FIG. 3 is a schematic view for describing the operation of the substance to be treated in the method for producing LiMO in one aspect of the present embodiment. In the present embodiment, the surface of the layer of the substance to be treated refers to the surface that is not in contact with the rotary cylinder 53 when the substance to be treated has been loaded into the rotary cylinder 53.

In a case where a substance to be treated 60 is heated while the rotary cylinder 53 is rotated as shown in FIG. 3, the substance to be treated 60 is considered to move while being stirred in the rotary cylinder 53 by the repetition of two operations of (1) movement along an arc with a radius $r_{max}$, which is in the radial direction of the rotary cylinder 53, in association with the rotation of the rotary cylinder 53 (indicated by a reference number 70 in FIG. 3) and (2) movement that makes the surface of the layer of the substance to be treated 60 slide down (indicated by a reference number 71 in FIG. 3). The direct contact between the substance to be treated 60 and the oxygen-containing gas occurs at the time of the operation (2). Therefore, it is considered that the reaction between oxygen and the substance to be treated 60 sufficiently progresses in the operation (2). In the present embodiment, with attention paid to the probability of the substance to be treated being present on the surface of the layer of the substance to be treated 60, the movement distance in the operation (2) is calculated as the average movement distance of the substance to be treated where the surface of the layer of the substance to be treated is moved in the heating region of the heating device. When this value is 13 m or longer, the contact time between the substance to be treated and oxygen is sufficient, and the reaction between the substance to be treated and oxygen is promoted.

The lower limit value of the average movement distance of the substance to be treated is 13 m, preferably 15 m, and more preferably 17 m. The upper limit value of the average movement distance of the substance to be treated is not particularly limited and is, for example, about 9000 m. The average movement distance of the substance to be treated is preferably 13 to 9000 m, more preferably 15 m or longer and shorter than 5000 m, still more preferably 15 to 3000 m, and particularly preferably 17 to 2000 m.

The average movement distance of the substance to be treated is calculated by a formula (I).

Average movement distance of substance to be treated=$\{(A{\times}B{\times}C{\times}D)^2+E^2\}^{0.5}$ (1)

A: The number of times of substance to be treated sliding down per rotation of rotary cylinder [times/number of rotations]

B: The number of rotations of rotary cylinder per unit time [rotation/sec]

C: Holding time in heating region L of substance to be treated [sec]

D: Movement distance of chord portion when substance to be treated slides down once [in/time]

E: Length of heating region L [m]

Here, the number of times A of the substance to be treated sliding down per rotation of the rotary cylinder can be calculated from the inner diameter of the rotary cylinder 53 and the dimensions of the surface of the layer of the substance to be treated 60 with respect to the volume of the rotary cylinder 53. Specifically, A is calculated by the following formula (11).

$$A = \frac{\pi}{\sin^{-1}\left(\frac{k}{2r_{min}}\right)} \quad (\mathrm{II})$$

The inner diameter of the rotary cylinder 53 is, for example, 0.05 to 10 m, preferably 0.07 to 5 m, and more preferably 0.09 to 2 m.

The loading rate of the substance to be treated 60 is preferably 1 to 20%, more preferably 3 to 17%, and still more preferably 5 to 15%. The loading rate of the substance to be treated 60 means the proportion of the volume of the substance to be treated 60 present in the rotary cylinder 53 to the volume of the rotary cylinder 53. The volume of the substance to be treated is calculated from the following formula (A). The "average bulk density" in the formula will be described below.

$$
\begin{aligned}
\text{Volume [m}^3\text{] of substance to be treated} = {}& 0.4 \times \text{charged} \\
& \text{amount [kg/hr] of substance to be treated} \times \text{reten-} \\
& \text{tion time [hr] of substance to be treated in} \\
& \text{rotary cylinder } \mathbf{53}\text{/average bulk density [kg/m}^3] \\
& \text{of substance to be treated} + 0.6 \times \text{amount [kg/hr]} \\
& \text{of heated substance to be treated discharged} \times \\
& \text{retention time [hr] of substance to be treated in} \\
& \text{rotary cylinder } \mathbf{53}\text{/average bulk density [kg/m}^3] \\
& \text{of heated substance to be treated}
\end{aligned}
\tag{A}
$$

In the formula (II), k represents the dimension of the surface of the layer of the substance to be treated 60 in an X-X' cross section when the substance to be treated 60 has been loaded into the rotary cylinder 53. $r_{min}$ indicates the distance between the intersection of a perpendicular line drawn from the axis Z of the rotary cylinder 53 to the X-X' cross section and the axis Z of the rotary cylinder 53.

While depending on the inner diameter of the rotary cylinder 53 and the loading rate of the substance to be treated 60 into the rotary cylinder 53, the dimension k of the surface of the layer of the substance to be treated 60 is, for example, 0.01 to 10 m, preferably 0.03 to 5 m, and more preferably 0.05 to 2 m.

In a case where the stirring blades 58 are provided in the rotary cylinder 53, it is conceivable that the substance to be treated slides down at the stirring blades 58. Therefore, a value obtained by multiplying the above-described A by the number of the stirring blades 58 installed is the number of times of the substance to be treated sliding down per rotation of the rotary cylinder.

Figure 4:
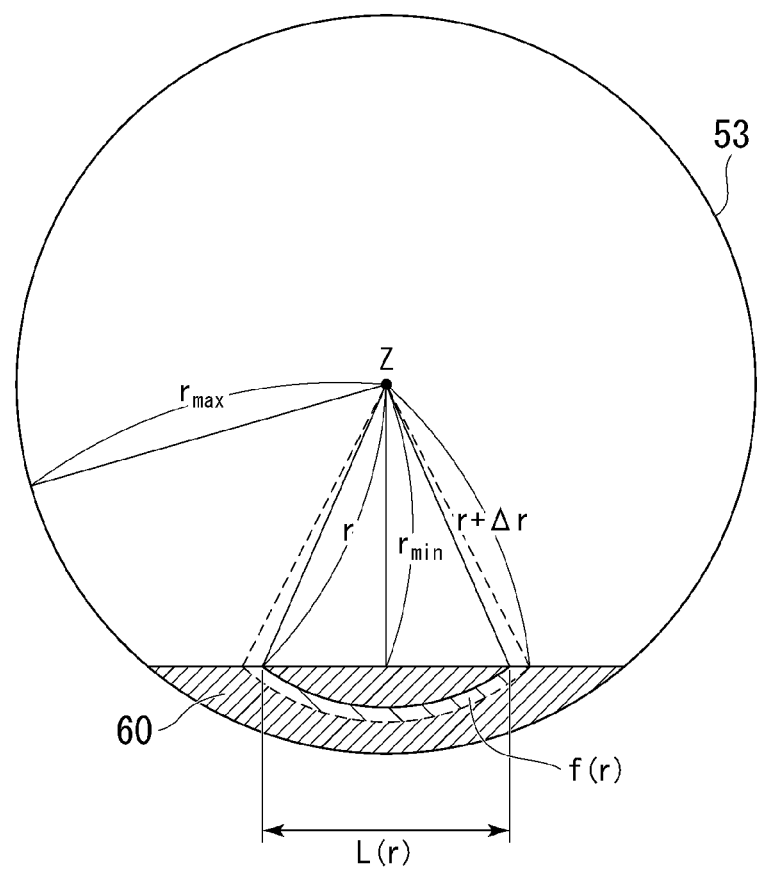
FIG. 4 is a schematic view for describing a method for calculating an average movement distance of the substance to be treated where a surface of a layer of the substance to be treated is moved in one aspect of the present embodiment.

The movement distance D of the chord portion when the substance to be treated slides down once can be calculated by the following formula (III) according to a method for calculating the expected value based on the state of the substance to be treated in a virtual rotary cylinder shown in FIG. 4. In the present invention, the Euler method is used as the solution to the formula (III).

$$
D = \int_{r_{min}}^{r_{max}} L(r)f(r)dr
\tag{III}
$$

In the formula (IT), r represents the distance between the surface of the substance to be treated 60 and the axis Z. $r_{min}$ represents the shortest distance between the surface of the substance to be treated 60 and the axis Z. $r_{min}$ represents a value that is half the inner diameter of the rotary cylinder 53. L(r) represents the movement distance of the substance to be treated 60 at the distance r, that is, the length of the chord at the distance r. f(r) represents the presence proportion of particles in a minute section from the distance r to a distance $r+\Delta r$ (the shaded portion in FIG. 4).

The rotation speed of the rotary cylinder 53 in the heating of the substance to be treated is preferably 0.003 to 0.5 rad/sec. The rotation speed of the rotary cylinder 53 is more preferably 0.05 to 0.4 rad/sec and still more preferably 0.08 to 0.3 rad/sec. When the rotation speed of the rotary cylinder 53 is 0.003 to 0.5 rad/sec, the average movement distance of the substance to be treated can be controlled to be 13 m or longer.

The substance to be treated is heated in the rotary cylinder 53 under the above-described conditions, and the resulting heated substance to be treated is discharged from the outlet 52. In the heating of the substance to be treated, it is preferable that the substance to be treated is charged from the inlet 51 and the heated substance to be treated is discharged from the outlet 52 such that a value represented by the following formula (IV) becomes 0.80 to 1.30. The value represented by the formula (IV) is more preferably 0.82 to 1.29 and still more preferably 0.85 to 1.28.

$$
\begin{aligned}
& \text{Volume of substance to be treated that is charged per} \\
& \quad \text{hour [m}^3\text{/hr]/volume of heated substance to be} \\
& \quad \text{treated that is discharged per hour [m}^3\text{/hr]}
\end{aligned}
\tag{IV}
$$

$$
\begin{aligned}
& \text{Volume of substance to be treated that is charged per} \\
& \quad \text{hour [m}^3\text{/hr]} = \text{amount of substance to be treated} \\
& \quad \text{charged [kg/hr]/average bulk density of sub-} \\
& \quad \text{stance to be treated [kg/m}^3]
\end{aligned}
\tag{IV-i}
$$

$$
\begin{aligned}
& \text{Volume of heated substance to be treated that is dis-} \\
& \quad \text{charged per hour [m}^3\text{/hr]} = \text{amount of heated} \\
& \quad \text{substance to be treated discharged [kg/hr]/aver-} \\
& \quad \text{age bulk density of heated substance to be} \\
& \quad \text{treated [kg/m}^3]
\end{aligned}
\tag{IV-ii}
$$

In a case where the value represented by the formula (IV) is 1.00 or more, this indicates that the volume of the heated substance to be treated is smaller than the volume of the charged substance to be treated. In a case where the substance to be treated is the mixture of MCC and the lithium compound, the value represented by the formula (IV) tends to become 1.00 or more.

On the other hand, in a case where the value represented by the formula (IV) is less than 1.00, this indicates that the volume of the heated substance to be treated is larger than the volume of the charged substance to be treated. In a case where the substance to be treated is the reactant of MCC and the lithium compound, there are cases where the value represented by the formula (IV) becomes less than 1.00. The reason therefor is that, when MCC and the lithium compound are heated and reacted, the heated substance to be treated aggregates and coarse particles are generated. For example, when the reactant containing coarse particles is heated, there is a possibility that the coarse particles may be crushed and the volume of the heated substance to be treated may increase.

In a case where the substance to be treated is uniformly mixed in the heating of the substance to be treated and the average movement distance satisfies 13 m or longer, the value represented by the formula (IV) satisfies 0.80 to 1.30. Therefore, when the value represented by the formula (IV) is 0.80 to 1.30, it is conceivable that the reaction between the substance to be treated and oxygen is promoted in the heating step. In a case where the value represented by the formula (IV) exceeds 1.30, it is conceivable that the volume of the heated substance to be treated becomes small due to the excessive progress of calcining, the substance to be treated and the heated substance to be treated are not uniformly mixed due to a large difference in volume, the proportion of the substance to be treated that is not sufficiently in contact with oxygen increases, and the reactivity between the substance to be treated and oxygen is likely to deteriorate. In a case where the value represented by the formula (IV) is less than 0.80, it is conceivable that the heated product excessively aggregates due to a decrease in the oxygen proportion in the oxygen-containing gas, coarse particles are generated, the volume of the heated substance to be treated becomes large, the substance to be treated and the heated substance to be treated are not uniformly mixed due to a large difference in volume, the proportion of the substance to be treated that is not sufficiently in contact with oxygen increases, and the reactivity between the substance to be treated and oxygen is likely to deteriorate.

In addition, the average bulk density in the present specification is a value measured by the following method.

$$\text{Average bulk density } [\text{g/cm}^3] = (\text{heavy bulk density } [\text{g/cm}^3] + \text{light bulk density } [\text{g/cm}^3]) \times 0.5$$

In the measurement of the light bulk density in the present specification, 200 cm$^3$ of a powder (that is, the substance to be treated or the heated substance to be treated) is freely dropped from above and loaded into a 250 cm$^3$ graduated cylinder, and the powder weight of 200 cm$^3$ of the powder is divided by the powder volume of 200 cm$^3$. The heavy bulk density is a value obtained by loading 200 cm$^3$ of the powder by free drop at the time of the measurement of the light bulk density, tapping the graduated cylinder 200 times from a height of 3 cm, and dividing the powder mass by the powder volume after the tapping.

As described above, when the substance to be treated is heated in the oxygen-containing atmosphere while the rotary cylinder is rotated such that the average movement distance in the heating region of the heating facility becomes 13 m or longer, the reaction between the substance to be treated and oxygen is promoted. Therefore, in LiMO produced by the production method of the present embodiment, an oxygen deficient structure is less likely to be formed. As a result, it is possible to improve the cycle retention rate in a case where a lithium secondary battery is repeatedly charged and discharged.

The mixture of the metal composite oxide and the lithium compound may be heated in the presence of an inert melting agent. As the inert melting agent, for example, those described in WO 2019/177032 can be used. Heating in the presence of the inert melting agent makes it possible to promote the reaction between the substance to be treated and oxygen. The inert melting agent may remain in heated LiMO or may be removed by washing LiMO with a washing liquid or the like after the heating. In the present embodiment, the heated LiMO is preferably washed with pure water or an alcohol.

LiMO obtained by the above-described heating may be appropriately pulverized and classified. In addition, post-calcining may be further performed after the above-described heating. The heating temperature during the post-calcining is, for example, 350° C. or higher and lower than 700° C.

<LiMO>

LiMO produced by the above-described production method has the following properties.

LiMO is represented by, for example, a composition formula (V).

$$\text{Li}[\text{Li}_m(\text{Ni}_{(1-n)}\text{X}_n)_{1-m}]\text{O}_2 \qquad (V)$$

(in the formula (V), X represents one or more elements selected from the group consisting of Co, Mn, Fe, Cu, Ti, Mg, Al, W, Mo, Nb, Zn, Sn, Zr, Ga, V, B, Si, S, and P, $-0.1 \leq m \leq 0.2$, $0 < n < 0.7$, and $0 < m+n < 0.8$ are satisfied).

From the viewpoint of obtaining a lithium secondary battery having a high cycle retention rate, m in the composition formula (V) is $-0.1$ or more, more preferably $-0.05$ or more, and still more preferably $-0.01$ or more. In addition, from the viewpoint of obtaining a lithium secondary battery having a higher initial coulombic efficiency, m is 0.2 or less, preferably 0.08 or less, and more preferably 0.05 or less.

The upper limit value and lower limit value of m can be randomly combined together. As the combination, for example, in's of $-0.1$ to 0.2, $-0.01$ to 0.2, $-0.05$ to 0.08, more than $-0.01$ and 0.05 or less, and the like are exemplary examples.

From the viewpoint of improving cycle characteristics, n is more than 0, preferably 0.01 or more, and more preferably 0.02 or more. From the viewpoint of obtaining a lithium secondary battery having a high charge capacity, n is less than 0.7, preferably 0.5 or less, and more preferably 0.3 or less.

The upper limit value and lower limit value of n can be randomly combined together. n is more than 0 and less than 0.7, preferably 0.01 to 0.5, and more preferably 0.05 to 0.3.

From the viewpoint of obtaining a lithium secondary battery having a high cycle retention rate, X is preferably one or more metals selected from the group consisting of Co, Mn, Ti, Mg, Al, W, B, and Zr and more preferably one or more metals selected from the group consisting of Co, Mn, Al, W, B, and Zr.

The composition of LiMO can be analyzed, for example, using an ICP emission spectrometer (Optima7300 manufactured by PerkinElmer Co., Ltd.) after LiMO is dissolved in hydrochloric acid.

In the present embodiment, the crystal structure of LiMO is a layered structure and more preferably a hexagonal crystal structure or a monoclinic crystal structure.

The hexagonal crystal structure belongs to any one space group selected from the group consisting of P3, P3$_1$, P3$_2$, R3, P-3, R-3, P312, P321, P3$_1$12, P3$_1$21, P3$_2$12, P3$_2$21, R32, P3m1, P31nm, P3c1, P31c, R3m, R3c, P-31m, P-31c, P-3m1, P-3c, R-3m, R-3c, P6, P6, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6mm, P6cc, P6$_3$cm, P6$_3$mc, P-6m2, P-6c2, P-62m, P-62c, P6/mmm, P6/mcc, P6$_3$/mcm, and P6$_3$/mmc.

In addition, the monoclinic crystal structure belongs to any one space group selected from the group consisting of P2, P2$_1$, C2, Pm, Pc, Cm, Cc, P2/m, P2$_1$/m, C2/m, P2/c, P2$_1$/c, and C2/c.

Among these, in order to obtain a lithium secondary battery having a high discharge capacity, the crystal structure is particularly preferably a hexagonal crystal structure belonging to the space group R-3m or a monoclinic crystal structure belonging to C2/m.

<CAM>

CAM of the present embodiment contains LiMO produced by the above-described method. CAM of the present embodiment may contain LiMO other than LiMO of the present embodiment.

<Lithium Secondary Battery>

Next, the configuration of a lithium secondary battery that is suitable in a case where LiMO of the present embodiment is used as CAM will be described.

Furthermore, a positive electrode for a lithium secondary battery that is suitable in a case where LiMO of the present embodiment is used as CAM (hereinafter, referred to as the positive electrode in some cases) will be described.

Furthermore, a lithium secondary battery that is suitable for an application of a positive electrode will be described.

An example of the lithium secondary battery that is suitable in a case where LiMO of the present embodiment is used as CAM has a positive electrode, a negative electrode, a separator interposed between the positive electrode and the negative electrode, and an electrolytic solution disposed between the positive electrode and the negative electrode.

An example of the lithium secondary battery has a positive electrode, a negative electrode, a separator interposed between the positive electrode and the negative electrode, and an electrolytic solution disposed between the positive electrode and the negative electrode.

Figure 5:
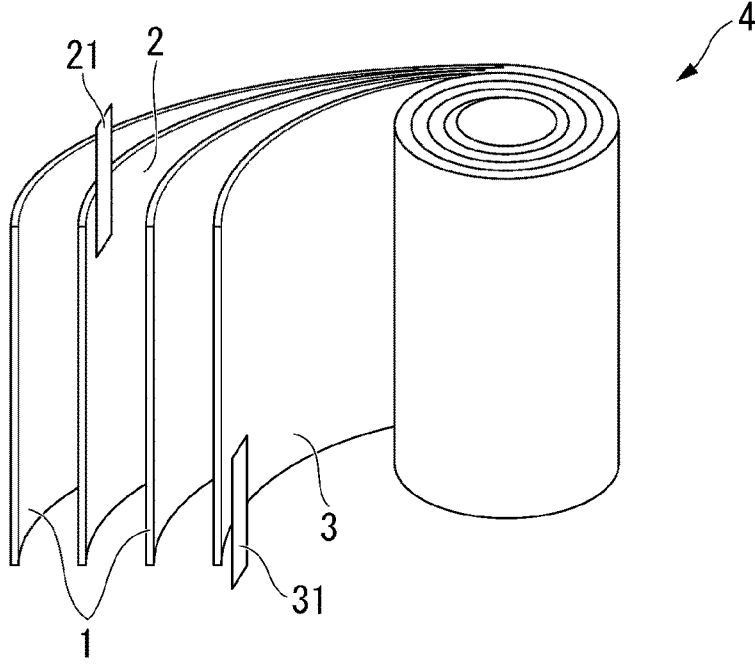
FIG. 5 is a schematic configuration view showing an example of a lithium secondary battery.
Figure 6:
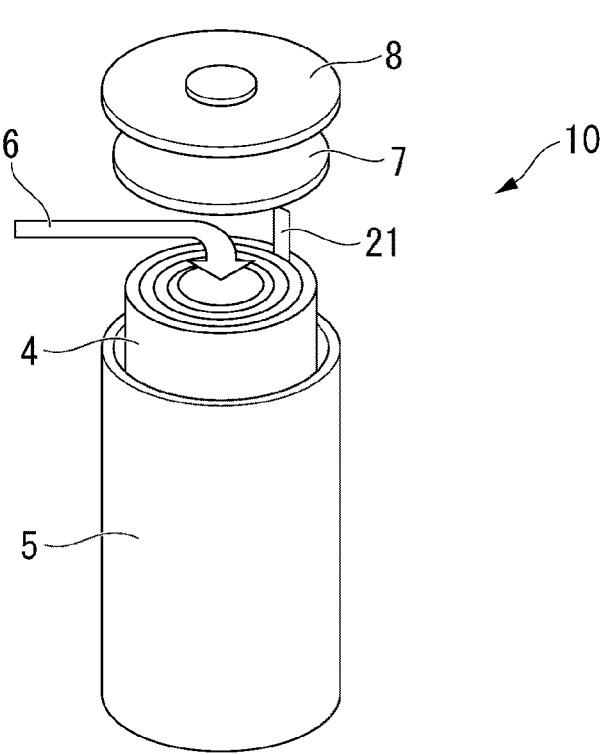
FIG. 6 is a schematic configuration view showing the example of the lithium secondary battery.

FIG. 5 and FIG. 6 are schematic views showing an example of the lithium secondary battery. A cylindrical lithium secondary battery 10 of the present embodiment is produced as described below.

First, as shown in FIG. 5, a pair of separators 1 having a strip shape, a strip-shaped positive electrode 2 having a positive electrode lead 21 at one end, and a strip-shaped negative electrode 3 having a negative electrode lead 31 at one end are laminated in order of the separator 1, the positive electrode 2, the separator 1, and the negative electrode 3 and are wound to form an electrode group 4.

Next, as shown in FIG. 6, the electrode group 4 and an insulator, not shown, are accommodated in a battery can 5, and then the can bottom is sealed. The electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be produced.

As the shape of the electrode group 4, for example, a columnar shape in which the cross-sectional shape becomes a circle, an ellipse, a rectangle, or a rectangle with rounded corners when the electrode group 4 is cut in a direction perpendicular to the winding axis is an exemplary example.

In addition, as the shape of a lithium secondary battery having such an electrode group 4, a shape that is specified by IEC60086, which is a standard for batteries specified by the International Electrotechnical Commission (IEC) or by JIS C 8500 can be adopted. For example, shapes such as a cylindrical shape and a square shape can be exemplary examples.

Furthermore, the lithium secondary battery is not limited to the winding-type configuration and may have a laminate-type configuration in which the laminated structure of the positive electrode, the separator, the negative electrode, and the separator is repeatedly overlaid. As the laminate-type lithium secondary battery, a so-called coin-type battery, button-type battery, or paper-type (or sheet-type) battery can be an exemplary example.

Hereinafter, each configuration will be described in order.
(Positive Electrode)

The positive electrode can be produced by, first, preparing a positive electrode mixture containing a positive electrode active material, a conductive material, and a binder and supporting the positive electrode mixture by a positive electrode current collector.
(Conductive Material)

As the conductive material in the positive electrode, a carbon material can be used. As the carbon material, graphite powder, carbon black (for example, acetylene black), a fibrous carbon material, and the like can be exemplary examples.

The proportion of the conductive material in the positive electrode mixture is preferably 5 to 20 parts by mass with respect to 100 parts by mass of the positive electrode active material.
(Binder)

As the binder in the positive electrode, a thermoplastic resin can be used. As the thermoplastic resin, polyimide resins; fluororesins such as polyvinylidene fluoride (hereinafter, referred to as PVdF in some cases) and polytetrafluoroethylene, polyolefin resins such as polyethylene and polypropylene, and the resins described in WO 2019/098384A1 or US2020/0274158A1 can be exemplary examples.
(Positive Electrode Current Collector)

As the positive electrode current collector in the positive electrode, a strip-shaped member formed of a metal material such as Al, Ni, or stainless steel as a forming material can be used.

As a method for supporting the positive electrode mixture by the positive electrode current collector, a method in which a paste of the positive electrode mixture is prepared using an organic solvent, the paste of the positive electrode mixture to be obtained is applied to and dried on at least one surface side of the positive electrode current collector, and the positive electrode mixture is fixed by pressing is an exemplary example.

As the organic solvent that can be used in a case where the paste of the positive electrode mixture is prepared, an amide-based solvent such as N-methyl-2-pyrrolidone (hereinafter, referred to as NMP in some cases) is an exemplary example.

As the method for applying the paste of the positive electrode mixture to the positive electrode current collector, a slit die coating method, a screen coating method, a curtain coating method, a knife coating method, a gravure coating method, and an electrostatic spraying method are exemplary examples.

The positive electrode can be produced by the method exemplified above.
(Negative Electrode)

The negative electrode in the lithium secondary battery needs to be a material which can be doped with lithium ions and from which lithium ions can be de-doped at a potential lower than that of the positive electrode, and an electrode in which a negative electrode mixture containing a negative electrode active material is supported by a negative electrode current collector and an electrode formed of a negative electrode active material alone are exemplary examples.
(Negative Electrode Active Material)

As the negative electrode active material in the negative electrode, materials which are a carbon material, a chalcogen compound (oxide, sulfide, or the like), a nitride, a metal, or an alloy and which can be doped with lithium ions and from which lithium ions can be de-doped at a potential lower than that of the positive electrode are exemplary examples.

As the carbon material that can be used as the negative electrode active material, graphite such as natural graphite or artificial graphite, cokes, carbon black, pyrolytic carbons, a carbon fiber, and a calcined product of an organic polymer-fired compound body can be exemplary examples.

As oxides that can be used as the negative electrode active material, oxides of silicon represented by a formula $SiO_x$ (here, x is a positive real number) such as $SiO_2$ and SiO; oxides of tin represented by a formula $SnO_x$ (here, x is a positive real number) such as $SnO_2$ and SnO; and metal composite oxides containing lithium and titanium or vanadium such as $Li_4Ti_5O_{12}$ and $LiVO_2$ can be exemplary examples.

In addition, as the metal that can be used as the negative electrode active material, lithium metal, silicon metal, tin metal, and the like can be exemplary examples.

As a material that can be used as the negative electrode active material, the materials described in WO 2019/098384A1 or US2020/0274158A1 may be used.

These metals and alloys can be used as an electrode, mainly, singly after being processed into, for example, a foil shape.

Among the above-described negative electrode active materials, the carbon material containing graphite such as natural graphite or artificial graphite as a main component is preferably used for the reason that the potential of the negative electrode rarely changes (the potential flatness is favorable) from an uncharged state to a fully-charged state during charging, the average discharging potential is low, the capacity retention rate at the time of repeatedly charging and discharging the lithium secondary battery is high (the cycle characteristics are favorable), and the like. The shape of the carbon material may be, for example, any of a flaky shape such as natural graphite, a spherical shape such as meso-carbon microbeads, a fibrous shape such as a graphitized carbon fiber, or an aggregate of fine powder.

The negative electrode mixture may contain a binder as necessary. As the binder, thermoplastic resins can be exemplary examples, and specifically, PVdF, thermoplastic polyimide, carboxymethylcellulose (hereinafter, referred to as CMC in some cases), styrene-butadiene rubber (hereinafter, referred to as SBR in some cases), polyethylene, and polypropylene can be exemplary examples.

(Negative Electrode Current Collector)

As the negative electrode current collector in the negative electrode, a strip-shaped member formed of a metal material such as Cu, Ni, or stainless steel as the forming material can be an exemplary example.

As a method for supporting the negative electrode mixture by the negative electrode current collector, similar to the case of the positive electrode, a method in which the negative electrode mixture is formed by pressurization and a method in which a paste of the negative electrode mixture is prepared using a solvent or the like, applied and dried on the negative electrode current collector, and then the negative electrode mixture is compressed by pressing are exemplary examples.

(Separator)

As the separator in the lithium secondary battery, it is possible to use, for example, a material that is made of a material such as a polyolefin resin such as polyethylene or polypropylene, a fluororesin, or a nitrogen-containing aromatic polymer and has a form such as a porous film, a non-woven fabric, or a woven fabric. In addition, the separator may be formed using two or more of these materials or the separator may be formed by laminating these materials. In addition, the separators described in JP-A-2000-030686 or US20090111025A1 may be used.

(Electrolytic Solution)

The electrolytic solution in the lithium secondary battery contains an electrolyte and an organic solvent.

As the electrolyte that is contained in the electrolytic solution, lithium salts such as $LiClO_4$, $LiPF_6$, and $LiBF_4$ are exemplary examples, and a mixture of two or more thereof may be used.

In addition, as the organic solvent that is contained in the electrolytic solution, for example, carbonates such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy) ethane can be used.

As the organic solvent, two or more of the above-described organic solvents are preferably used in a mixture form. Among these, a solvent mixture containing a carbonate is preferable, and a solvent mixture of a cyclic carbonate and a non-cyclic carbonate and a solvent mixture of a cyclic carbonate and an ether are more preferable.

In addition, as the electrolytic solution, it is preferable to use an electrolytic solution containing a lithium salt containing fluorine such as $LiPF_6$ and an organic solvent having a fluorine substituent since the safety of lithium secondary batteries to be obtained is enhanced. As the electrolyte and the organic solvent that are contained in the electrolytic solution, the electrolytes and the organic solvents described in WO2019/098384A1 or US2020/0274158A1 may be used.

<All-Solid-State Lithium Secondary Battery>

Next, a positive electrode for which LiMO according to an aspect of the present invention is used as a positive electrode active material for an all-solid-state lithium secondary battery and an all-solid-state lithium secondary battery having this positive electrode will be described while describing the configuration of the all-solid-state lithium secondary battery.

Figure 7:
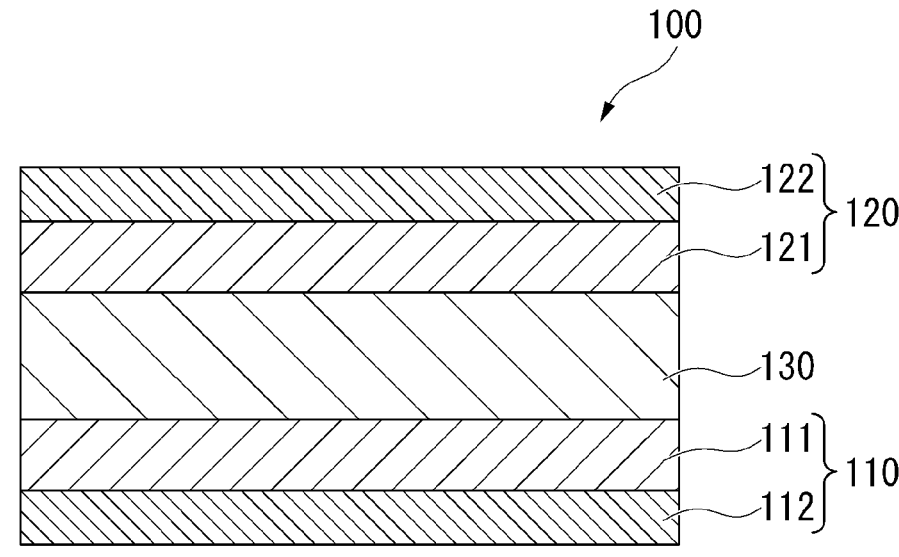
FIG. 7 is a schematic view showing a laminate that an all-solid-state lithium secondary battery of the present embodiment includes.
Figure 8:
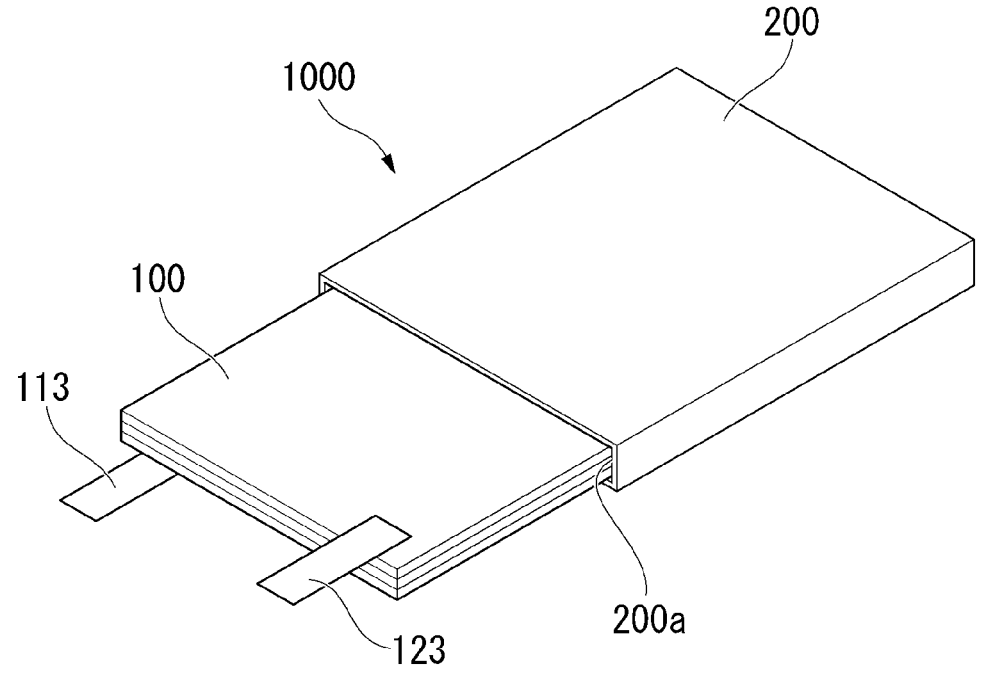
FIG. 8 is a schematic view showing an entire configuration of the all-solid-state lithium secondary battery of the present embodiment.

FIG. 7 and FIG. 8 are schematic views showing an example of an all-solid-state lithium secondary battery of the present embodiment. An all-solid-state lithium secondary battery 1000 shown in FIG. 7 and FIG. 8 has a laminate 100 having a positive electrode 110, a negative electrode 120, and a solid electrolyte layer 130 and an exterior body 200 accommodating the laminate 100. In addition, the all-solid-state lithium secondary battery 1000 may have a bipolar structure in which a positive electrode active material and a negative electrode active material are disposed on both sides of a current collector. As specific examples of the bipolar structure, for example, the structures described in JP-A-2004-95400 are exemplary examples. A material that configures each member will be described below.

The laminate 100 may have an external terminal 113 that is connected to a positive electrode current collector 112 and an external terminal 123 that is connected to a negative electrode current collector 122. In addition, the all-solid-state lithium secondary battery 1000 may have a separator between the positive electrode 110 and the negative electrode 120.

The all-solid-state lithium secondary battery 1000 further has an insulator, not shown, that insulates the laminate 100 and the exterior body 200 from each other and a sealant, not shown, that seals an opening portion 200a of the exterior body 200.

As the exterior body 200, a container formed of a highly corrosion-resistant metal material such as aluminum, stainless steel or nickel-plated steel can be used. In addition, as the exterior body 200, a container obtained by processing a laminate film having at least one surface on which a corrosion resistant process has been performed into a bag shape can also be used.

As the shape of the all-solid-state lithium secondary battery 1000, for example, shapes such as a coin type, a button type, a paper type (or a sheet type), a cylindrical type, a square type, and a laminate type (pouch type) can be exemplary examples.

As an example of the all-solid-state lithium secondary battery 1000, a form in which one laminate 100 is provided is shown in the drawings, but the present embodiment is not limited thereto. The all-solid-state lithium secondary battery 1000 may have a configuration in which the laminate 100 is used as a unit cell and a plurality of unit cells (laminates 100) is sealed inside the exterior body 200.

Hereinafter, each configuration will be described in order.

(Positive Electrode)

The positive electrode 110 of the present embodiment has a positive electrode active material layer 11*l* and a positive electrode current collector 112.

The positive electrode active material layer 111 contains LiMO, which is one aspect of the present invention described above, and a solid electrolyte. In addition, the positive electrode active material layer 111 may contain a conductive material and a binder.

(Solid Electrolyte)

As the solid electrolyte that is contained in the positive electrode active material layer 11*l* of the present embodiment, a solid electrolyte that has lithium ion conductivity and used in well-known all-solid-state batteries can be adopted. As the solid electrolyte, an inorganic electrolyte and an organic electrolyte can be exemplary examples. As the inorganic electrolyte, an oxide-based solid electrolyte, a sulfide-based solid electrolyte, and a hydride-based solid electrolyte can be exemplary examples. As the organic electrolyte, polymer-based solid electrolytes are exemplary examples. As each electrolyte, the compounds described in WO 2020/208872A1, US2016/0233510A1, US2012/0251871A1, and US2018/0159169A1 are exemplary examples, and examples thereof include the following compounds.

(Oxide-Based Solid Electrolyte)

As the oxide-based solid electrolyte, for example, a perovskite-type oxides, a NASICON-type oxide, a LISICON-type oxide, a garnet-type oxides, and the like are exemplary examples. Specific examples of each oxide include the compounds described in WO 2020/208872A1, US2016/0233510A1, and US2020/0259213A1, and, for example, the following compounds are exemplary examples.

As the garnet-type oxide, Li—La—Zr-based oxides such as $Li_7La_3Zr_2O_{12}$ (also referred to as LLZ) are exemplary examples.

The oxide-based solid electrolyte may be a crystalline material or an amorphous material.

(Sulfide-Based Solid Electrolyte)

As the sulfide-based solid electrolyte, $Li_2S$—$P_2S_5$-based compounds, $Li_2S$—$SiS_2$-based compounds, $Li_2S$—$GeS_2$-based compounds, $Li_2S$—$B_2S_3$-based compounds, $Li_2S$—$P_2S_3$-based compounds, $LiI$—$Si_2S$—$P_2S_5$, $LiI$—$Li_2S$—$P_2O_5$, $LiI$—$Li_3PO_4$—$P_2S_5$, $Li_{10}GeP_2S_{12}$, and the like can be exemplary examples.

In the present specification, the expression "-based compound" that indicates the sulfide-based solid electrolyte is used as a general term for solid electrolytes mainly containing a raw material written before "-based compound" such as "$Li_2S$" or "$P_2S_5$". For example, the $Li_2S$—$P_2S_5$-based compounds include solid electrolytes mainly containing $Li_2S$ and $P_2S_5$ and further containing a different raw material. The proportion of $Li_2S$ that is contained in the $Li_2S$—$P_2S_5$-based compound is, for example, 50 to 90 mass % with respect to the entire $Li_2S$—$P_2S_5$-based compound. The proportion of $P_2S_5$ that is contained in the $Li_2S$—$P_2S_5$-based compound is, for example, 10 to 50 mass % with respect to the entire $Li_2S$—$P_2S_5$-based compound. In addition, the proportion of the different raw material that is contained in the $Li_2S$—$P_2S_5$-based compound is, for example, 0 to 30 mass % with respect to the entire $Li_2S$—$P_2S_5$-based compound. In addition, the $Li_2S$—$P_2S_5$-based compounds also include solid electrolytes containing $Li_2S$ and $P_2S_5$ in different mixing ratios.

As the $Li_2S$—$P_2S_5$-based compounds, $Li_2S$—$P_2S_5$, $Li_2S$—$P_2S_5$—$LiI$, $Li_2S$—$P_2S_5$—$LiCl$, $Li_2S$—$P_2S_5$—$LiBr$, and the like can be exemplary examples.

As the $Li_2S$—$SiS_2$-based compounds, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$SiS_2$—$P_2S_5$—$LiCl$, and the like are exemplary examples.

As the $Li_2S$—$GeS_2$-based compounds, $Li_2S$—$GeS_2$, $Li_2S$—$GeS_2$—$P_2S_5$, and the like are exemplary examples.

The sulfide-based solid electrolyte may be a crystalline material or an amorphous material.

Two or more solid electrolytes can be jointly used as long as the effect of the invention is not impaired.

(Conductive Material and Binder)

As the conductive material that the positive electrode active material layer 111 of the present embodiment has, the materials described in the above-described (conductive material) can be used. In addition, as for the proportion of the conductive material in the positive electrode mixture, the proportions described in the above-described (conductive material) can be applied in the same manner. In addition, as the binder that the positive electrode has, the materials described in the above-described (binder) can be used.

(Positive Electrode Current Collector)

As the positive electrode current collector 112 that the positive electrode 110 of the present embodiment has, the materials described in the above-described (positive electrode current collector) can be used.

As a method for supporting the positive electrode active material layer 111 by the positive electrode current collector 112, a method in which the positive electrode active material layer 111 is formed by pressurization on the positive electrode current collector 112 is an exemplary example. A cold press or a hot press can be used for the pressurization.

In addition, the positive electrode active material layer 111 may be supported by the positive electrode current collector 112 by preparing a paste of a mixture of the positive electrode active material, the solid electrolyte, the conductive material, and the binder using an organic solvent to produce a positive electrode mixture, applying and drying the positive electrode mixture to be obtained on at least one surface of the positive electrode current collector 112, and fixing the positive electrode mixture by pressing.

In addition, the positive electrode active material layer 111 may be supported by the positive electrode current collector 112 by preparing a paste of a mixture of the positive electrode active material, the solid electrolyte, and the conductive material using an organic solvent to produce a positive electrode mixture, applying and drying the positive electrode mixture to be obtained on at least one surface of the positive electrode current collector 112, and calcining the positive electrode mixture.

As the organic solvent that can be used for the positive electrode mixture, the same organic solvent as the organic solvent that can be used in the case of preparing the paste of the positive electrode mixture described in the above-described (positive electrode current collector) can be used.

As a method of applying the positive electrode mixture to the positive electrode current collector 112, the methods described in the above-described section (positive electrode current collector) are exemplary example.

The positive electrode 110 can be produced by the method exemplified above.

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the negative electrode active material, the negative electrode current collector, the solid electrolyte, the conductive material, and a binder, those described above can be used.

(Solid Electrolyte Layer)

The solid electrolyte layer 130 has the above-described solid electrolyte.

The solid electrolyte layer 130 can be formed by depositing a solid electrolyte of an inorganic substance on the surface of the positive electrode active material layer 111 in the above-described positive electrode 110 by a sputtering method.

In addition, the solid electrolyte layer 130 can be formed by applying and drying a paste-form mixture containing a solid electrolyte on the surface of the positive electrode active material layer 111 in the above-described positive electrode 110. The solid electrolyte layer 130 may be formed by pressing the dried paste-form mixture and further pressurizing the paste-form mixture by a cold isostatic pressure method (CIP).

The laminate 100 can be produced by laminating the negative electrode 120 on the solid electrolyte layer 130 provided on the positive electrode 110 as described above using a well-known method such that the negative electrode active material layer 121 comes into contact with the surface of the solid electrolyte layer 130.

In the lithium secondary battery having the above-described configuration, since LiMO that is produced by the present embodiment described above is used as a positive electrode active material, it is possible to improve the cycle retention rate of the lithium secondary battery.

In addition, since positive electrodes having the above-described configuration have CAM having the above-described configuration, it is possible to improve the cycle retention rates of lithium secondary batteries.

Furthermore, the lithium secondary battery having the above-described configuration has the above-described positive electrode and thus becomes a secondary battery having a high cycle retention rate.

As another aspect, the present invention has the following aspects.

[1] A method for producing a lithium metal composite oxide, including rotating a rotary cylinder around an axis of the rotary cylinder under supply of an oxygen-containing gas using a heating facility including the rotary cylinder having an inlet at one end and an outlet at the other end to move the substance to be treated charged from the inlet of the heating facility in a direction toward the outlet and heating the substance to be treated, in which the substance to be treated includes one of a mixture of a metal composite compound and a lithium compound and a reactant of the metal composite compound and the lithium compound, in a heating region of the heating facility, an average movement distance of the substance to be treated where a surface of a layer of the substance to be treated is moved is 13 m or longer, and a heating temperature in the heating region is 700 to 800° C.

[2] A method for producing a lithium metal composite oxide, including charging a substance to be treated from an inlet of a heating facility including a rotary cylinder having the inlet at one end and an outlet at the other end, using the heating facility and rotating the rotary cylinder around an axis of the rotary cylinder under supply of an oxygen-containing gas to move the substance to be treated in a direction toward the outlet and heating the substance to be treated, in which the substance to be treated includes one of a mixture of a metal composite compound and a lithium compound and a reactant of the metal composite compound and the lithium compound, in a heating region of the heating facility, an average movement distance of the substance to be treated where a surface of a layer of the substance to be treated is moved is 13 m or longer, and a heating temperature in the heating region is 700 to 800° C.

[3] The method according to [1] or [2], in which the average movement distance of the substance to be treated is 15 m or longer.

[4] The method for producing a lithium metal composite oxide according to any one of [1] to [3], in which the lithium compound is lithium hydroxide.

[5] The method according to any one of [1] to [4], in which the substance to be treated is heated while the oxygen-containing gas is supplied into the rotary cylinder such that a ratio of an oxygen-containing gas flow rate to a mass of the substance to be treated becomes 0.5 to 10 Nm³/kg.

[6] The method according to any one of [1] to [5], in which the substance to be treated is continuously heated while the oxygen-containing gas is supplied into the rotary cylinder from the outlet, the oxygen-containing gas is discharged from the inlet, and, furthermore, outflow of the oxygen-containing gas from the outlet is blocked.

[7] The method according to any one of [1] to [6], in which the substance to be treated is heated such that a value represented by the following formula (IV) satisfies 0.80 to 1.30.

$$\text{Volume } [m^3/hr] \text{ of substance to be treated that is charged per hour/volume } [m^3/hr] \text{ of heated product that is discharged per hour} \quad (IV)$$

$$\text{Volume } [m^3 \text{ hr}] \text{ of substance to be treated that is charged per hour}=\text{amount } [kg/hr] \text{ of substance to be treated charged/average bulk density } [kg/m^3] \text{ of substance to be treated} \quad (IV\text{-}i)$$

$$\text{Volume } [m^3/hr] \text{ of heated product that is discharged per hour}=\text{amount } [kg/hr] \text{ of heated product discharged/average bulk density } [kg/m^3] \text{ of heated product} \quad (IV\text{-}ii).$$

[8] The method according to any one of [1] to [7], in which the substance to be treated is heated while the rotary cylinder is rotated such that a rotation speed becomes 0.08 to 0.3 rad/sec.

[9] The method according to any one of [1] to [8], in which the lithium metal composite oxide is represented by a composition formula (V).

$$Li[Li_m(N_{(1-n)}X_n)_{1-m}]O_2 \quad (V)$$

(in the formula (V), X represents one or more elements selected from the group consisting of Co, Mn, Fe, Cu, Ti, Mg, Al, W, Mo, Nb, Zn, Sn, Zr, Ga, V, B, Si, S, and P, $-0.05 \leq m \leq 0.08$, $0.05 \leq n \leq 0.3$, and $0 < m+n < 0.8$ are satisfied).

[10] The method according to any one of [1] to [9], in which a positive electrode active material containing the lithium metal composite oxide is used, and a cycle retention rate of a lithium secondary battery produced by a method described in sections <Production of positive electrode for lithium secondary battery> and <Production of lithium secondary battery (coin-type half cell)> to be described below becomes 86% or more.

EXAMPLES

Hereinafter, the present invention will be described in detail by showing examples, but the present invention is not limited to the following description.
<Composition Analysis>
The composition of LiMO that was produced by a method to be described below was analyzed using an ICP emission spectrometer (Optima7300 manufactured by PerkinElmer Co., Ltd.) after the obtained LiMO was dissolved in hydrochloric acid.
<Average Movement Distance>
The average movement distance was calculated by applying parameters of heating conditions in each example to the formula (I).
<Average Bulk Density>
The average bulk densities of a substance to be treated and LiMO were measured by the following method.

Average bulk density [g/cm³]=(heavy bulk density [g/cm³]+light bulk density [g/cm³])×0.5

In the measurement of the light bulk density, 200 cm³ of a powder (that is, the substance to be treated or the heated product) is freely dropped from above and loaded into a 250 cm³ graduated cylinder, and the powder weight of 200 cm³ of the powder is divided by the powder volume of 200 cm³. The heavy bulk density is a value obtained by loading 200 cm³ of the powder by free drop at the time of the measurement of the light bulk density, tapping the graduated cylinder 200 times from a height of 3 cm, and dividing the powder mass by the powder volume after the tapping.
<Production of Positive Electrode for Lithium Secondary Battery>
A paste-like positive electrode mixture was prepared by adding and kneading LiMO obtained by a production method to be described below, a conductive material (acetylene black), and a binder (PVdF) such that a composition of CAM:conductive material:binder=92:5:3 (mass ratio) was achieved. During the preparation of the positive electrode mixture, N-methyl-2-pyrrolidone was used as an organic solvent.
The obtained positive electrode mixture was applied to an Al foil having a thickness of 40 μm, which was to serve as a current collector, and dried in a vacuum at 150° C. for 8 hours, thereby obtaining a positive electrode for a lithium secondary battery. The electrode area of the positive electrode for the lithium secondary battery was set to 1.65 cm².
<Production of Lithium Secondary Battery (Coin-Type Half Cell)>
The following operation was performed in a glove box under an argon atmosphere.
The positive electrode for the lithium secondary battery produced in the section <Production of positive electrode for lithium secondary battery> was placed on the lower lid of a part for a coin-type battery R2032 (manufactured by Hohsen Corp.) with the aluminum foil surface facing downward, and a separator (polyethylene porous film) was placed on the positive electrode for the lithium secondary battery. An electrolytic solution (300 μl) was poured thereinto. As the electrolytic solution, an electrolytic solution obtained by dissolving LiPF₆ in a liquid mixture of ethylene carbonate, dimethyl carbonate, and ethyl methyl carbonate in a volume ratio of 30:35:35 in a proportion of 1.0 mol/l was used.
Next, lithium metal was used as a negative electrode, and the negative electrode was placed on the upper side of the laminated film separator. An upper lid was placed through a gasket and caulked using a caulking machine, thereby producing a lithium secondary battery (coin-type half cell R2032; hereinafter, referred to as the "half cell" in some cases).
<Cycle Retention Rate>
First, a lithium secondary battery, which was a coin-type half cell, was left to stand at room temperature for 10 hours to sufficiently impregnate the separator and the positive electrode mixture layer with an electrolytic solution.
Next, constant-current constant-voltage charging by which the lithium secondary battery was constant-current charged up to 4.3 V at room temperature at 1 mA and then constant-voltage charged at 4.3 V was performed for 5 hours, and then constant-current discharging by which the coin-type lithium secondary battery was discharged to 2.5 V at 1 mA was performed, thereby performing initial charge and discharge. The discharge capacity was measured, and the obtained value was defined as the "initial discharge capacity" (mAh/g). Furthermore, the charge capacity was measured, and the obtained value was defined as the "initial charge capacity" (mAh/g).
After the initial charge and discharge, charge at 1 mA and discharge at 1 mA were repeated under the same conditions as the initial charge and discharge. After that, the discharge capacity (mAh/g) at the 50ᵗʰ cycle was measured.
From the initial discharge capacity and the discharge capacity at the 50ᵗʰ cycle, the cycle retention rate was calculated by the following formula.

Cycle retention rate (%)=50ᵗʰ cycle discharge capacity (mAh/g)/initial discharge capacity (mAh/g)×100

Example 1

After water was poured into a reaction vessel equipped with a stirrer and an overflow pipe, an aqueous solution of sodium hydroxide was added thereto, and the liquid temperature was held at 50° C.
A nickel sulfate aqueous solution, a cobalt sulfate aqueous solution, and an aluminum sulfate aqueous solution were mixed together such that the atomic ratio of Ni, Co, and Al reached 0.88:0.09:0.03, thereby preparing a raw material liquid mixture.
Next, the raw material-mixed solution and an ammonium sulfate aqueous solution, as a complexing agent, were continuously added into the reaction vessel under stirring. An aqueous sodium hydroxide solution was added dropwise at appropriate times so that the pH of the solution in the reaction vessel reached 11.6 (measurement temperature: 40° C.), and a reaction precipitate 1 was obtained.
The reaction precipitate 1 was washed, then, dehydrated in a centrifuge, isolated, and dried at 105° C., thereby obtaining a metal composite hydroxide 1 containing Ni, Co, and Al.
The metal composite hydroxide 1 was held and heated at 650° C. for 5 hours in the atmospheric atmosphere and cooled to room temperature, thereby obtaining a metal composite oxide 1.
Lithium hydroxide was weighed so that the amount (mole ratio) of Li with respect to the total amount 1 of Ni, Co, and Al that were contained in the metal composite oxide 1 reached 1.10. The metal composite oxide 1 and lithium hydroxide were mixed with a mortar to obtain a mixture 1.

This mixture 1 was charged into a fluidized calcining furnace (manufactured by Noritake Co., Limited, trade name: desktop rotary kiln) and heated by being held at 650° C. for 2 hours in an oxygen atmosphere, thereby obtaining a reactant 1.

Next, the obtained reactant 1 was charged into the fluidized calcining furnace (manufactured by Noritake Co., Limited, trade name: desktop rotary kiln), an oxygen-containing gas was supplied into the rotary cylinder from the outlet side of the fluidized calcining furnace, the oxygen-containing gas was discharged from the inlet side, and, furthermore, the reactant 1 was calcined by being held under conditions shown in Table 1 for 2.0 hours while the outflow of the oxygen-containing gas from the outlet was blocked. At this time, the retention time in the heating region L was 1.1 hours, the length of the heating region L was 1.04 m, the half value of the inner diameter of the rotary cylinder was 0.054 m, and the dimension k of the surface of the layer of the substance 60 to be treated was 0.068 m, and $r_{min}$ was 0.042 m. In addition, oxygen was used as the oxygen-containing gas.

The obtained calcined product 1, was washed, then, dehydrated in a centrifuge, isolated, and dried at 250° C. in a nitrogen atmosphere, thereby obtaining LiMO-1.

As a result of the composition analysis of LiMO-1, it was found that, in the composition formula (V), in =–0.01, n=0.17, and the element X was Co and Al.

Example 2

The mixture 1 obtained in Example 1 was charged into a fluidized calcining furnace (manufactured by Noritake Co., Limited, trade name: desktop rotary kiln) and heated by being held at 680° C. for 2 hours in an oxygen atmosphere, thereby obtaining a reactant 2.

Next, LiMO-2 was obtained by the same procedure as in Example 1 except that, at the time of calcining the obtained reactant 2, the calcining temperature was set to 720° C., the holding time was set to 4.5 hours, the rotation speed of the rotary cylinder was set to 0.13 rad/sec, the retention time in the heating region L was set to 2.5 hours, the loading rate of the substance to be treated with respect to the volume of the rotary cylinder was set to 13.5%, and the average movement distance was set to 38.8 m.

As a result of the composition analysis of LiMO-2, it was found that, in the composition formula (V), m=0.03, n=0.11, and the element X was Co and Al.

Example 3

The mixture 1 obtained in Example 1 was heated by being held in a fluidized calcining furnace roller hearth kiln (manufactured by Noritake Co., Limited, trade name: special atmosphere roller hearth kiln) at 650° C. for 5 hours in an oxygen atmosphere, thereby obtaining a reactant 3.

Next, LiMO-3 was obtained by the same procedure as in Example 1 except that, at the time of calcining the obtained reactant 3, the calcining temperature was set to 760° C., the holding time was set to 1.3 hours, the rotation speed of the rotary cylinder was set to 0.13 rad/sec, the retention time in the heating region L was set to 0.72 hours, the loading rate of the substance to be treated with respect to the volume of the rotary cylinder was set to 7.9%, and the average movement distance was set to 14.8 m.

As a result of the composition analysis of LiMO-3, it was found that, in the composition formula (V), m=0.01, n=0.11, and the element X was Co and Al.

Comparative Example 1

The reactant 3 obtained in Example 3 was charged into a roller hearth kiln (manufactured by Noritake Co., Limited, trade name: special atmosphere roller hearth kiln), an oxygen-containing gas was supplied such that the ratio of the oxygen-containing gas flow rate to the mass of the reactant 3 became 3.6 $Nm^3$/kg, and the reactant was calcined by being held at 720° C. for 6 hours.

The obtained calcined product C1, was washed, then, dehydrated in a centrifuge, isolated, and dried at 250° C. in a nitrogen atmosphere, thereby obtaining LiMO-C1.

As a result of the composition analysis of LiMO-C1, it was found that, in the composition formula (V), m=0.01, n=0.11, and the element X was Co and Al.

Comparative Example 2

The mixture 1 obtained in Example 1 was charged into a fluidized calcining furnace (manufactured by Noritake Co., Limited, trade name: desktop rotary kiln) and calcined under conditions shown in Table 1. At this time, the retention time in the heating region L was set to 2.3 hours, the rotation speed of the rotary cylinder was set to 0.12 rad/sec, the loading rate of the substance to be treated with respect to the volume of the rotary cylinder was set to 11.5%, the average movement distance was set to 32.7 m, and an oxygen-containing gas was supplied such that the ratio of the oxygen-containing gas flow rate to the mass of the mixture 1 became 0.67 $Nm^3$/kg.

The obtained calcined product C2, was washed, then, dehydrated in a centrifuge, isolated, and dried at 250° C. in a nitrogen atmosphere, thereby obtaining LiMO-C2.

As a result of the composition analysis of LiMO-C2, it was found that, in the composition formula (V), m=0.02, n=0.12, and the element X was Co and Al.

Comparative Example 3

LiMO-C3 was obtained by the same procedure as in Example 1 except that, at the time of calcining the reactant 3 obtained in Example 3, the calcining temperature was set to 910° C., the holding time was set to 4.0 hours, the rotation speed of the rotary cylinder was set to 0.13 rad/sec, the retention time in the heating region L was set to 2.2 hours, the loading rate of the substance to be treated with respect to the volume of the rotary cylinder was set to 11.3%, and the average movement distance was set to 28.9 m.

As a result of the composition analysis of LiMO-C3, it was found that, in the composition formula (V), in =–0.02, n=0.11, and the element X was Co and Al.

Table 1 shows the production conditions of LiMO-1 to 3 of Examples 1 and 2 and LiMO-C1 to C3 of Comparative Examples 1 to 3 and the cycle retention rate of the coin-type half cell for which each LiMO was used.

TABLE 1

| Example/Comparative Example | Example 1 | Example 2 | Example 3 | Comparative Example 1 | Comparative Example 2 | Comparative Example 3 |
|---|---|---|---|---|---|---|
| Substance to be treated | Reactant | Reactant | Reactant | Reactant | Mixture | Reactant |
| Average movement distance [m] | 17.9 | 38.8 | 14.8 | 0 | 32.7 | 28.9 |
| Calcining temperature [° C.] | 760 | 720 | 760 | 720 | 650 | 910 |
| Oxygen-containing gas/substance to be treated [Nm³/kg] | 1.0 | 1.0 | 1.0 | 3.6 | 0.67 | 1.0 |
| Substance to be treated volume/calcined product volume | 1.27 | 0.81 | 0.90 | 0.95 | 1.68 | 0.93 |
| Rotation speed [rad/sec] | 0.12 | 0.13 | 0.13 | — | 0.12 | 0.13 |
| Rotary cylinder slant [°] | 1 | 1 | 3 | — | 1 | 1 |
| Loading rate [%] | 5.4 | 13.5 | 7.9 | — | 11.5 | 11.3 |
| Heating region retention time [hr] | 1.1 | 2.5 | 0.72 | 6 | 2.3 | 2.2 |
| Cycle retention rate [%] | 91.0 | 89.8 | 86.8 | 83.8 | 84.9 | 82.7 |

As shown in Table 1, when the substance to be treated was calcined by rotating the rotary cylinder in the oxygen-containing atmosphere such that the average movement distance in the heating region where the temperature was 700 to 900° C. became 13 m or longer as in Examples 1 to 3, the cycle retention rates of the coin-type half cells were 86.8% or more.

On the other hand, in Comparative Example 1 in which the average movement distance was shorter than 13 m, Comparative Example 2 in which the calcining temperature was lower than 700° C., and Comparative Example 3 in which the calcining temperature exceeded 900° C., the cycle retention rates of the coin-type half cells became low values of 84.9% or less.

INDUSTRIAL APPLICABILITY

According to the present invention, it is possible to provide a method for producing LiMO enabling the achievement of high-performance lithium secondary batteries when used as CAM.

REFERENCE SIGNS LIST

1: Separator, 2: Positive electrode, 3: Negative electrode, 4: Electrode group, 5: Battery can, 6: Electrolytic solution, 7: Top insulator, 8: Sealing body, 10: Lithium secondary battery, 21: Positive electrode lead, 31: Negative electrode lead, 50: Heating facility, 51: Inlet, 52: Outlet, 53: Rotary cylinder, 54: Heating means, 55: Gas supply port, 56: Gas discharge port, 57: Valve, 58: Stirring blade, 60: Substance to be treated, 100: Laminate, 110: Positive electrode, 111: Positive electrode active material layer, 112: Positive electrode current collector, 113: External terminal, 120: Negative electrode, 121: Negative electrode active material layer, 122: Negative electrode current collector, 123: External terminal. 130: Solid electrolyte layer, 200: Exterior body, 200a: Opening portion, 1000: All-solid-state lithium secondary battery

What is claimed is:

1. A method for producing a lithium metal composite oxide, comprising:
   charging a substance to be treated from an inlet of a heating facility including a rotary cylinder having the inlet at one end and an outlet at the other end, using the heating facility;

rotating the rotary cylinder around an axis of the rotary cylinder under supply of an oxygen-containing gas to move the substance to be treated in a direction toward the outlet and heat the substance to be treated; and discharging the heated substance to be treated from the outlet, wherein the substance to be treated includes one of a mixture of a metal composite compound and a lithium compound and a reactant of the metal composite compound and the lithium compound, in a heating region of the heating facility, an average movement distance of the substance to be treated where a surface of a layer of the substance to be treated is moved is 13 m or more, and a heating temperature in the heating region is 700° C. to 900° C., and wherein the substance to be treated is heated such that a value represented by a formula (IV) satisfies 0.80 to 1.30, $$\text{a volume [m}^3\text{/hr] of substance to be treated that is charged per hour/a volume [m/hr] of heated substance to be treated that is discharged per hour} \quad \text{(IV),}$$

$$\text{the volume [m}^3\text{/hr] of substance to be treated that is charged per hour} = \text{an amount [kg/hr] of substance to be treated charged/an average bulk density [kg/m}^3\text{] of substance to be treated} \quad \text{(IV-i), and}$$

$$\text{the volume [m}^3\text{/hr] of the heated substance to be treated that is discharged per hour} = \text{an amount [kg/hr] of the heated substance to be treated discharged/an average bulk density [kg/m}^3\text{] of heated substance to be treated} \quad \text{(IV-ii).}$$

2. The method according to claim 1,
   wherein the average movement distance of the substance to be treated is 15 m or more.

3. The method according to claim 2,
   wherein the lithium compound is lithium hydroxide.

4. The method according to claim 2,
   wherein the substance to be treated is heated while the oxygen-containing gas is supplied into the rotary cylinder such that a ratio of an oxygen-containing gas flow rate to a mass of the substance to be treated becomes 0.5 Nm³/kg or more.

5. The method according to claim 2,
   wherein the substance to be treated is continuously heated while the oxygen-containing gas is supplied into the rotary cylinder from the outlet, the oxygen-containing gas is discharged from the inlet, and, furthermore, outflow of the oxygen-containing gas from the outlet is blocked.

6. The method according to claim 2, wherein the substance to be treated is heated while the rotary cylinder is rotated such that a rotation speed becomes 0.003 to 0.5 rad/sec.

7. The method according to claim 2, wherein the lithium metal composite oxide is represented by a composition formula (V), $$Li[Li_m(Ni_{(1-n)}X_n)_{1-m}]O_2 \qquad (V)$$

in the formula (V), X represents one or more elements selected from the group consisting of Co, Mn, Fe, Cu, Ti, Mg, Al, W, Mo, Nb, Zn, Sn, Zr, Ga, V, B, Si, S, and P, $-0.1 \leq m \leq 0.2$, $0 < n < 0.7$, and $0 < m+n < 0.8$ are satisfied.

8. The method according to claim 1, wherein the lithium compound is lithium hydroxide.

9. The method according to claim 1, wherein the substance to be treated is heated while the oxygen-containing gas is supplied into the rotary cylinder such that a ratio of an oxygen-containing gas flow rate to a mass of the substance to be treated becomes 0.5 $Nm^3$/kg or more.

10. The method according to claim 1, wherein the substance to be treated is continuously heated while the oxygen-containing gas is supplied into the rotary cylinder from the outlet, the oxygen-containing gas is discharged from the inlet, and, furthermore, outflow of the oxygen-containing gas from the outlet is blocked.

11. The method according to claim 1, wherein the substance to be treated is heated while the rotary cylinder is rotated such that a rotation speed becomes 0.003 to 0.5 rad/sec.

12. The method according to claim 1, wherein the lithium metal composite oxide is represented by a composition formula (V), $$Li[Li_m(Ni_{(1-n)}X_n)_{1-m}]O_2 \qquad (V)$$

in the formula (V), X represents one or more elements selected from the group consisting of Co, Mn, Fe, Cu, Ti, Mg, Al, W, Mo, Nb, Zn, Sn, Zr, Ga, V, B, Si, S, and P, $-0.1 \leq m \leq 0.2$, $0 < n < 0.7$, and $0 < m+n < 0.8$ are satisfied.

\* \* \* \* \*